May 6, 1930.　　　　W. W. FRASER　　　　1,757,242
TURBINE LOCOMOTIVE
Filed May 8, 1925　　　19 Sheets-Sheet 1
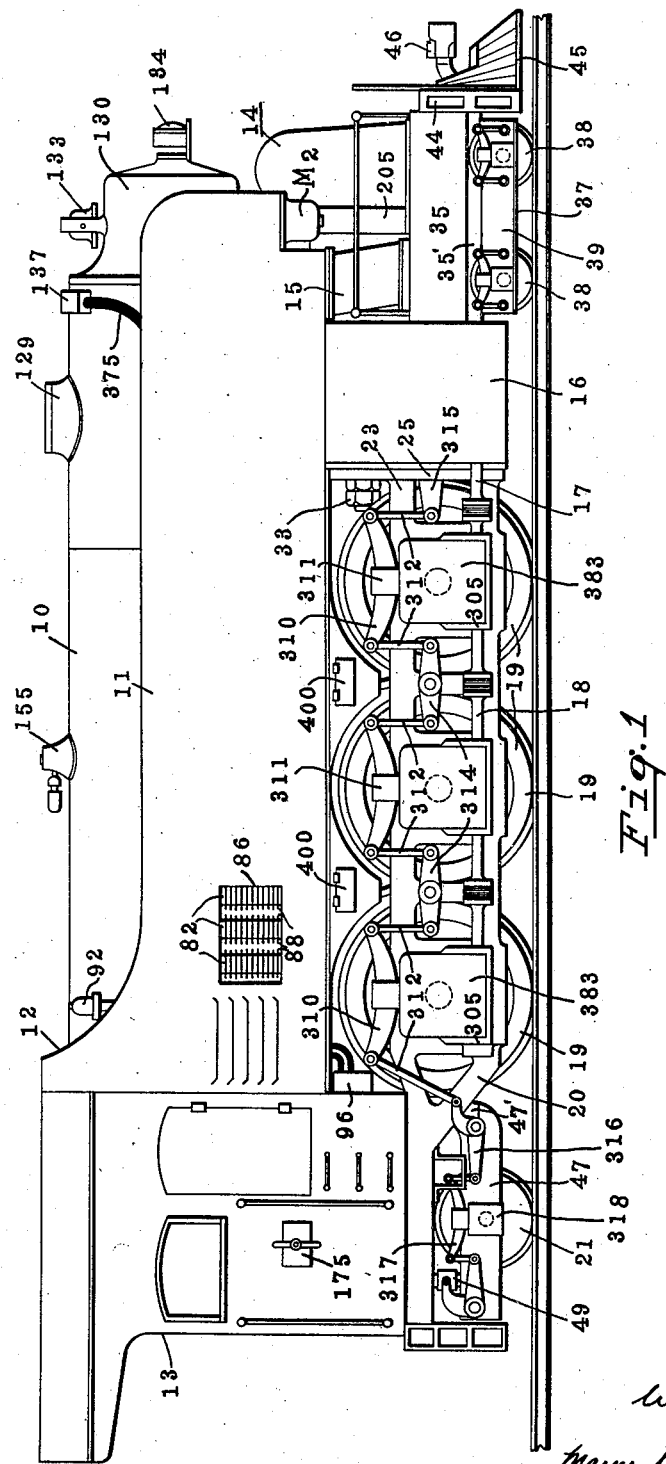
INVENTOR
William W. Fraser
BY
Mayer, Warfield & Watson
ATTORNEYS May 6, 1930. W. W. FRASER 1,757,242
TURBINE LOCOMOTIVE
Filed May 8, 1925 19 Sheets-Sheet 2

INVENTOR
William W. Fraser
BY
Mayer, Warfield & Watson
ATTORNEYS

May 6, 1930.　　　W. W. FRASER　　　1,757,242
TURBINE LOCOMOTIVE
Filed May 8, 1925　　19 Sheets-Sheet 3
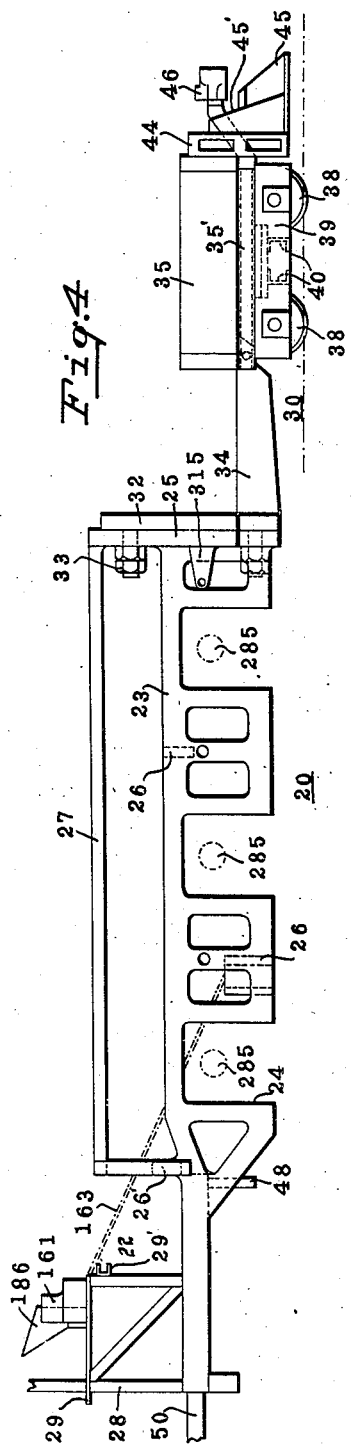
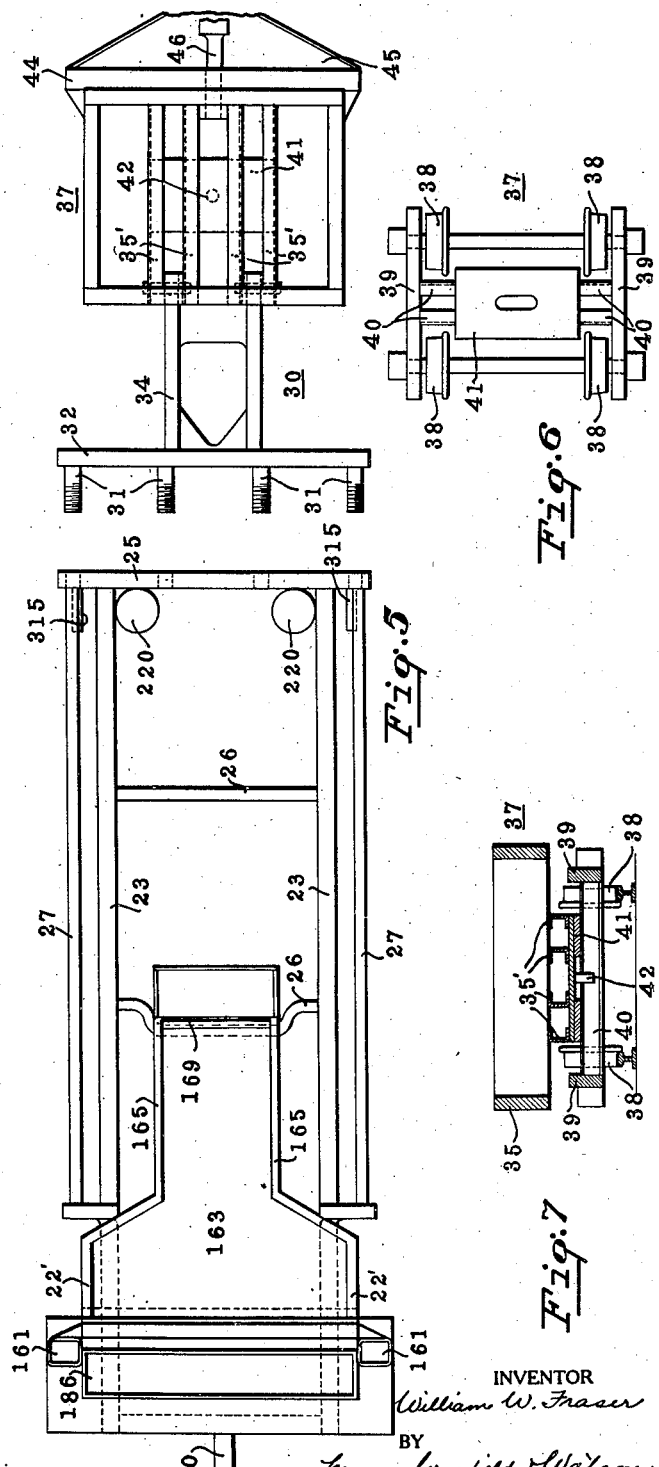
INVENTOR
William W. Fraser
BY
Mayer, Warfield & Watson
ATTORNEYS

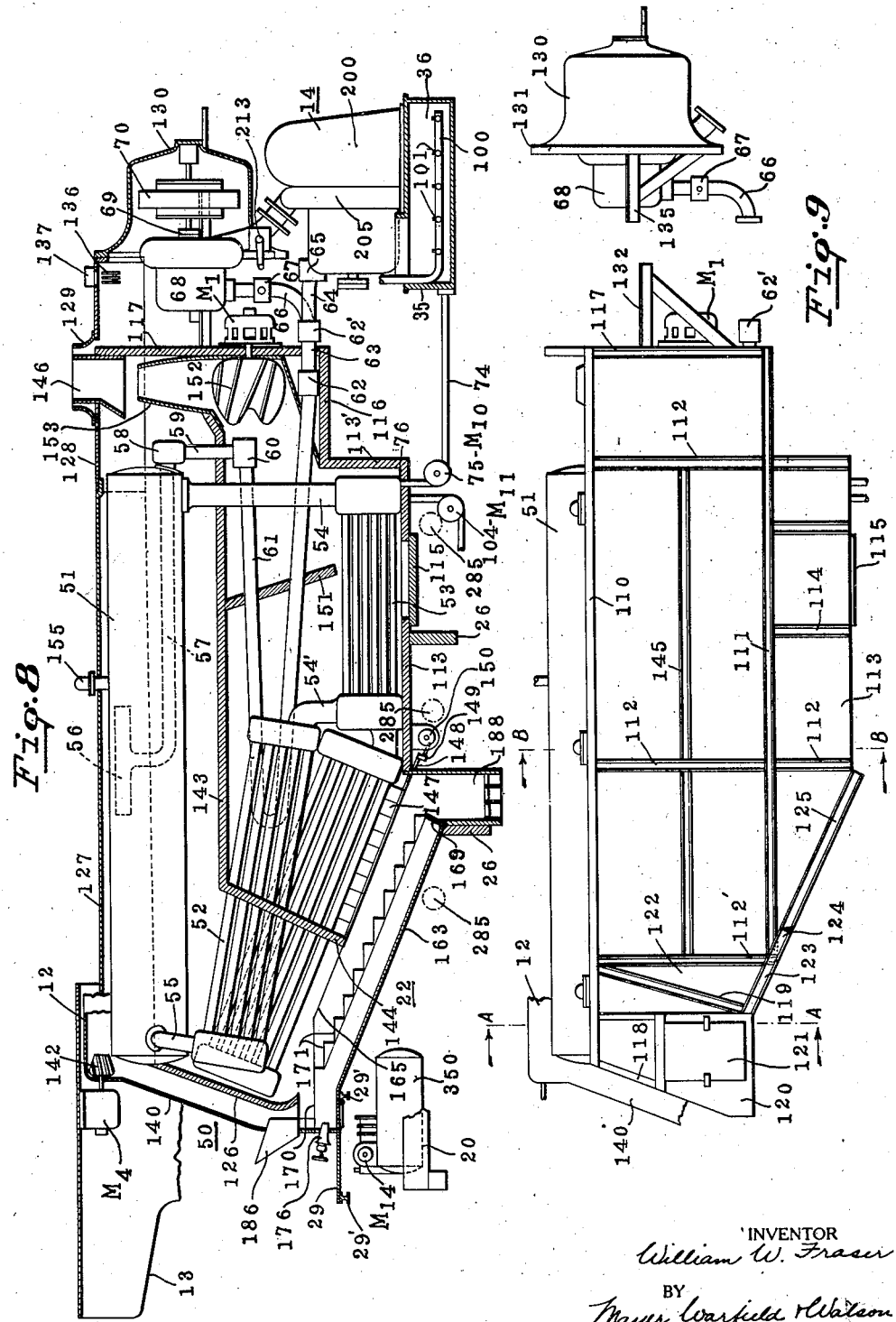

May 6, 1930.  W. W. FRASER  1,757,242
TURBINE LOCOMOTIVE
Filed May 8, 1925   19 Sheets-Sheet 5
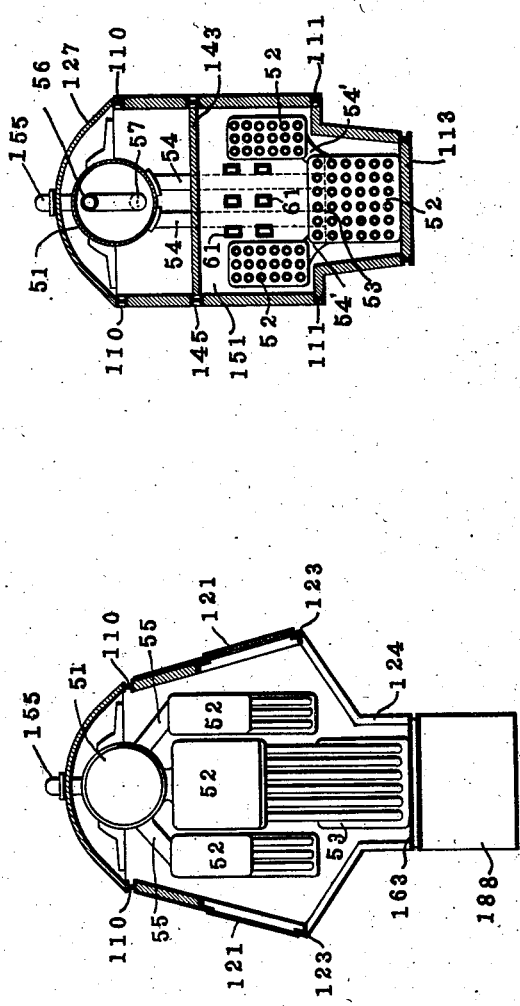
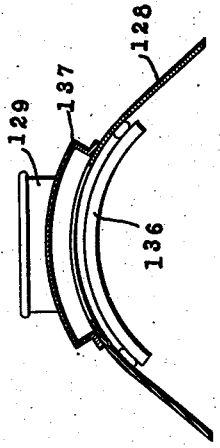
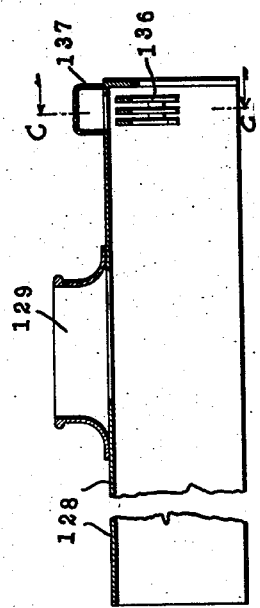
INVENTOR
William W. Fraser
BY
Mayer, Warfield & Watson
ATTORNEYS

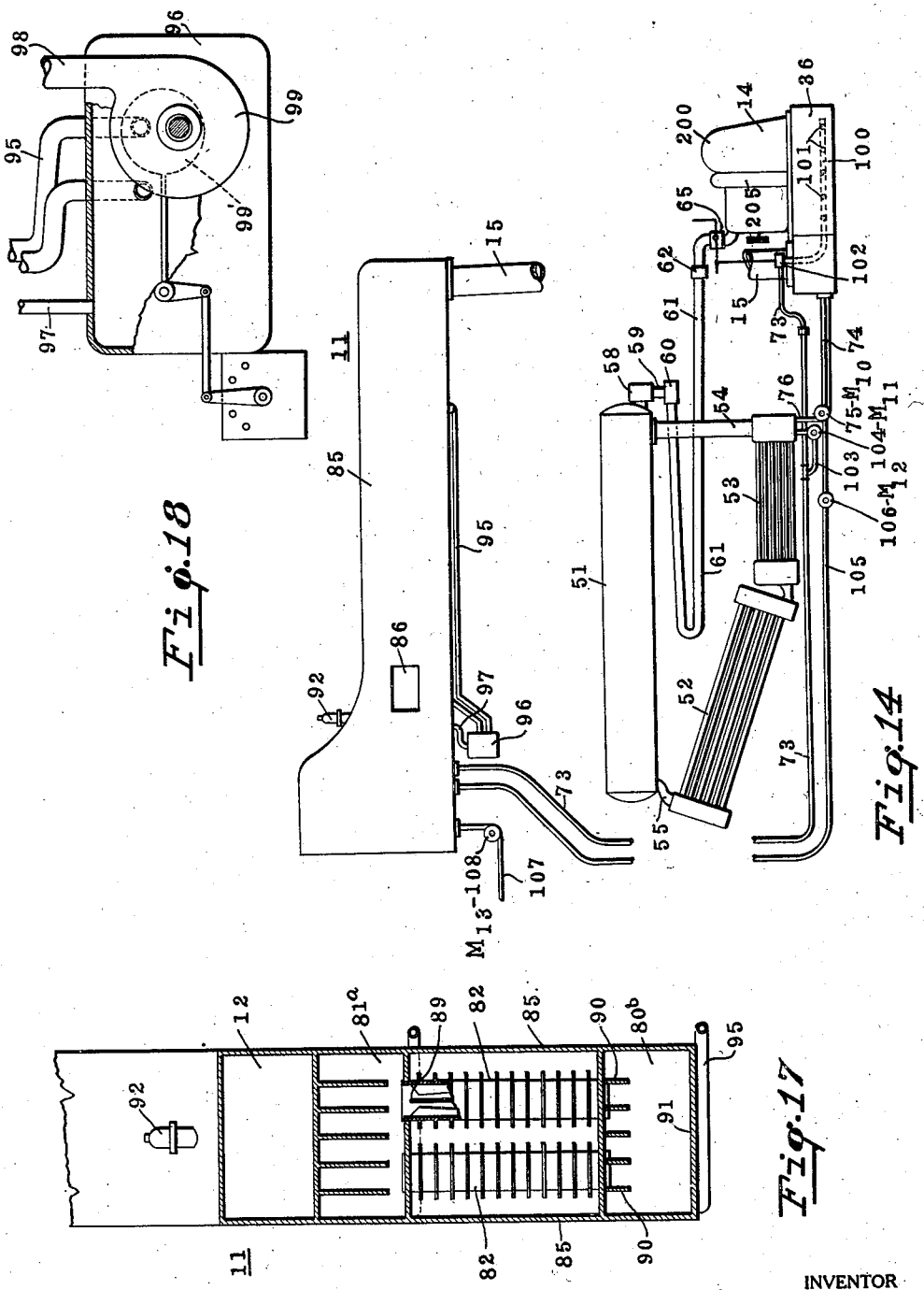

May 6, 1930.    W. W. FRASER    1,757,242
TURBINE LOCOMOTIVE
Filed May 8, 1925    19 Sheets-Sheet 7
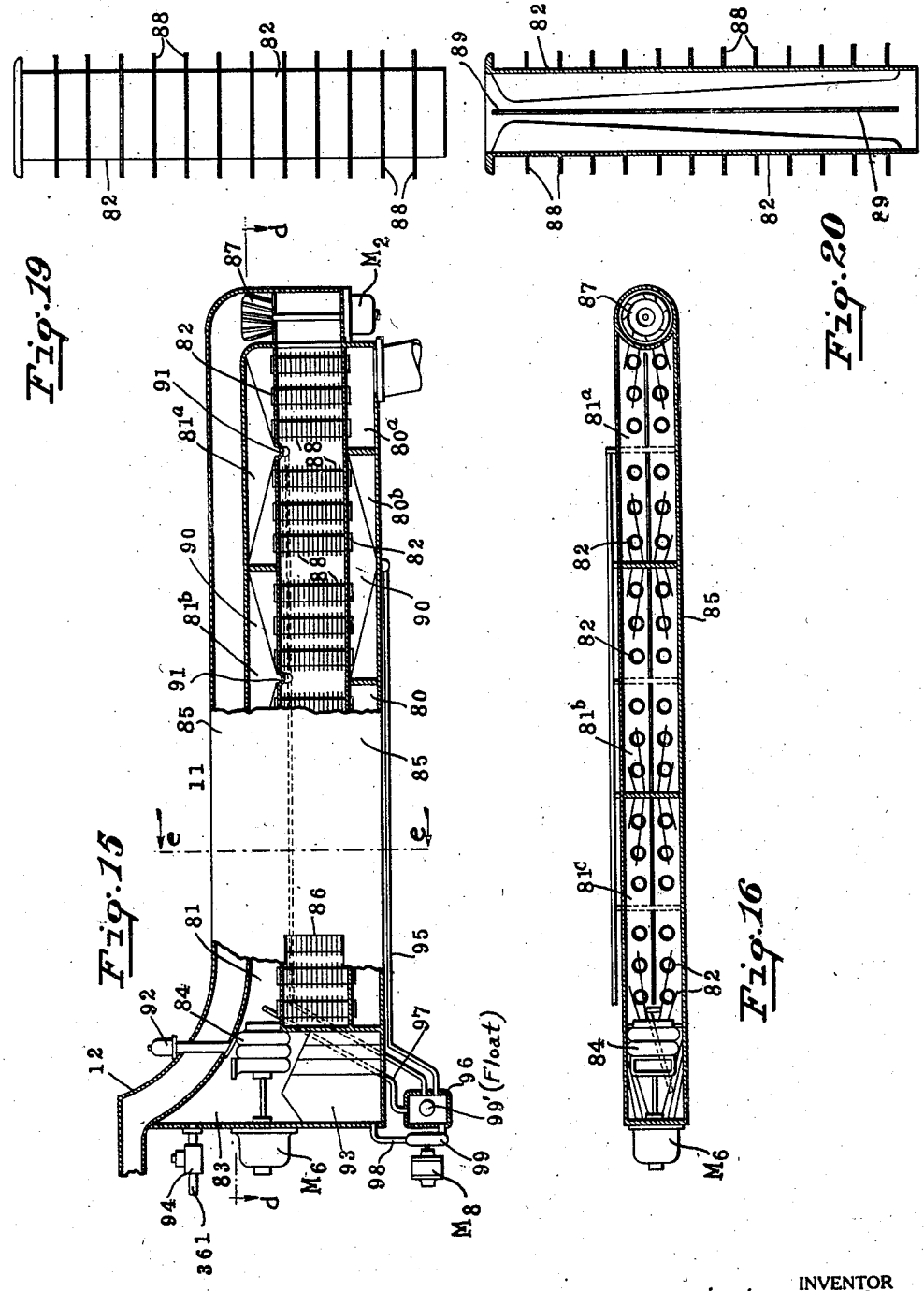

May 6, 1930. W. W. FRASER 1,757,242
TURBINE LOCOMOTIVE
Filed May 8, 1925 19 Sheets-Sheet 8
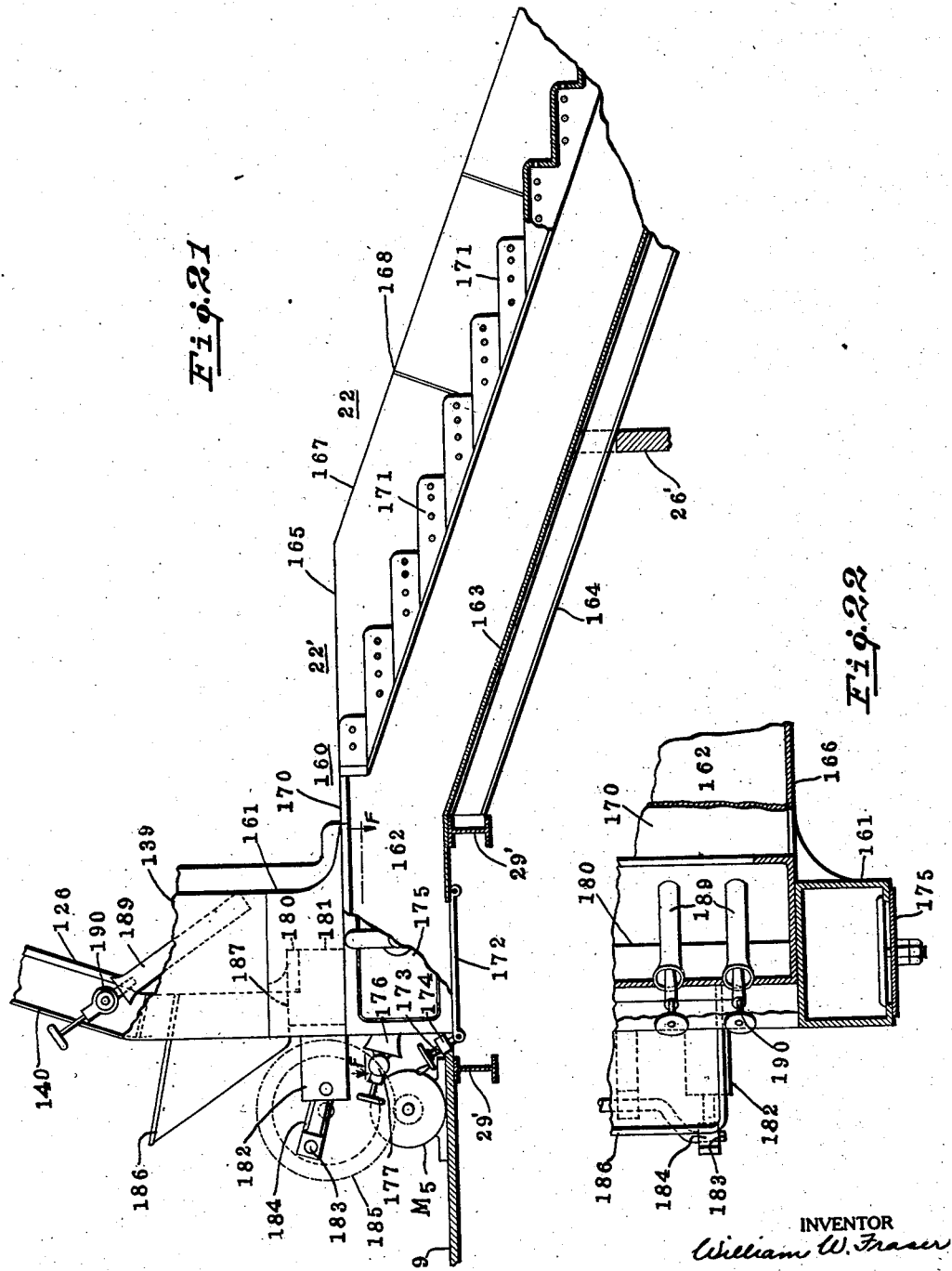
INVENTOR
William W. Fraser
BY
Mayer, Warfield & Watson
ATTORNEYS

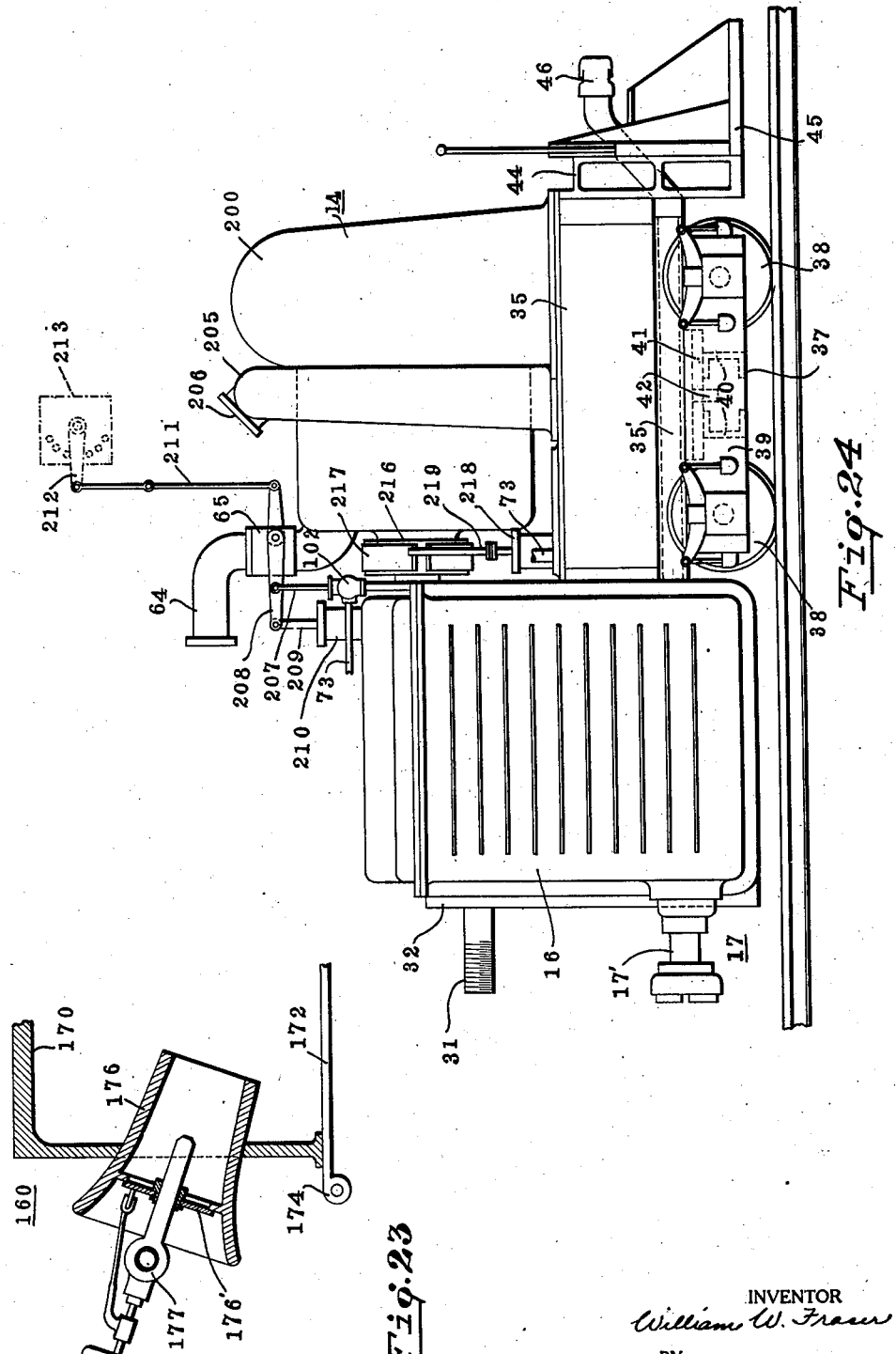

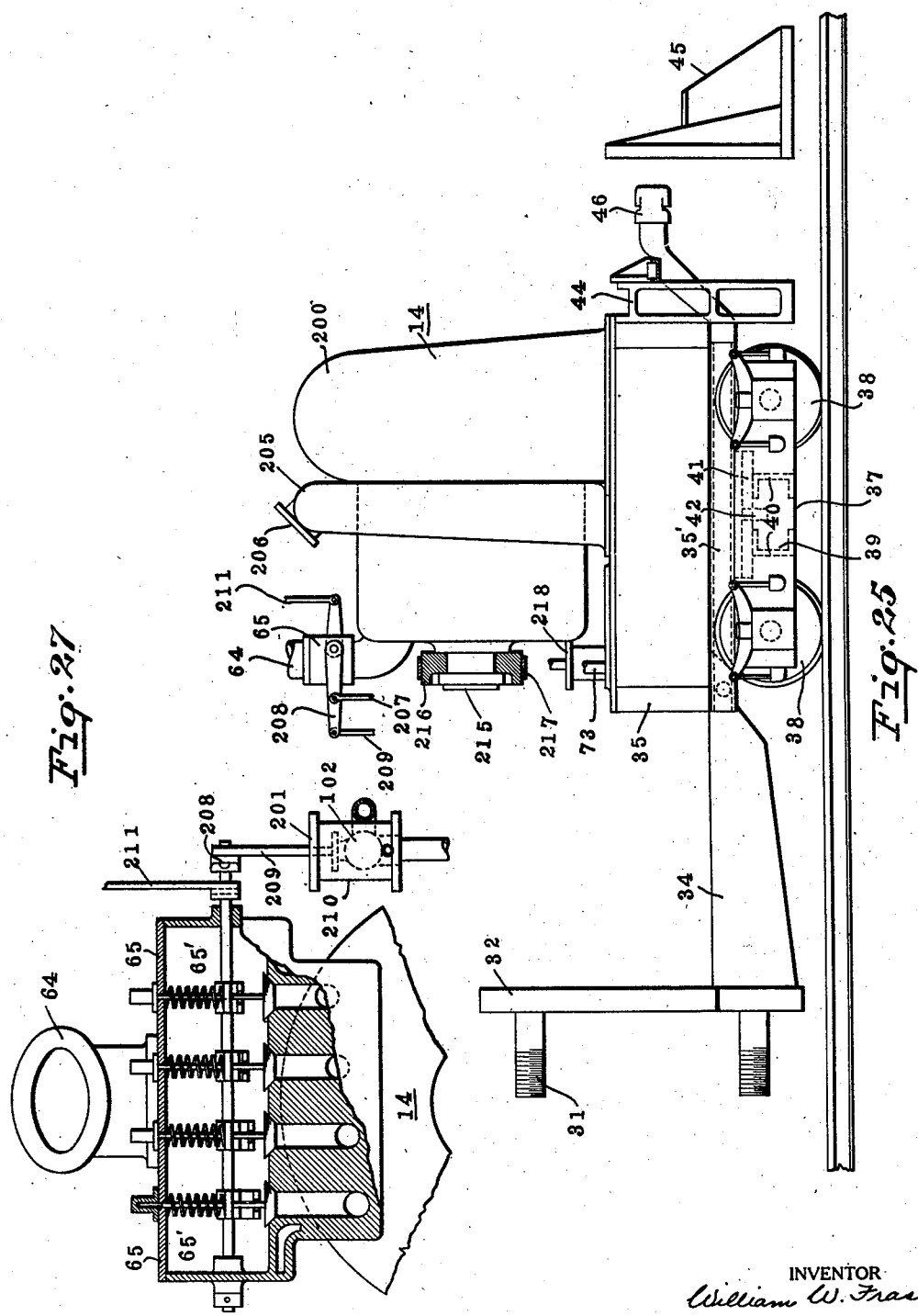

May 6, 1930.   W. W. FRASER   1,757,242
TURBINE LOCOMOTIVE
Filed May 8, 1925   19 Sheets-Sheet 11
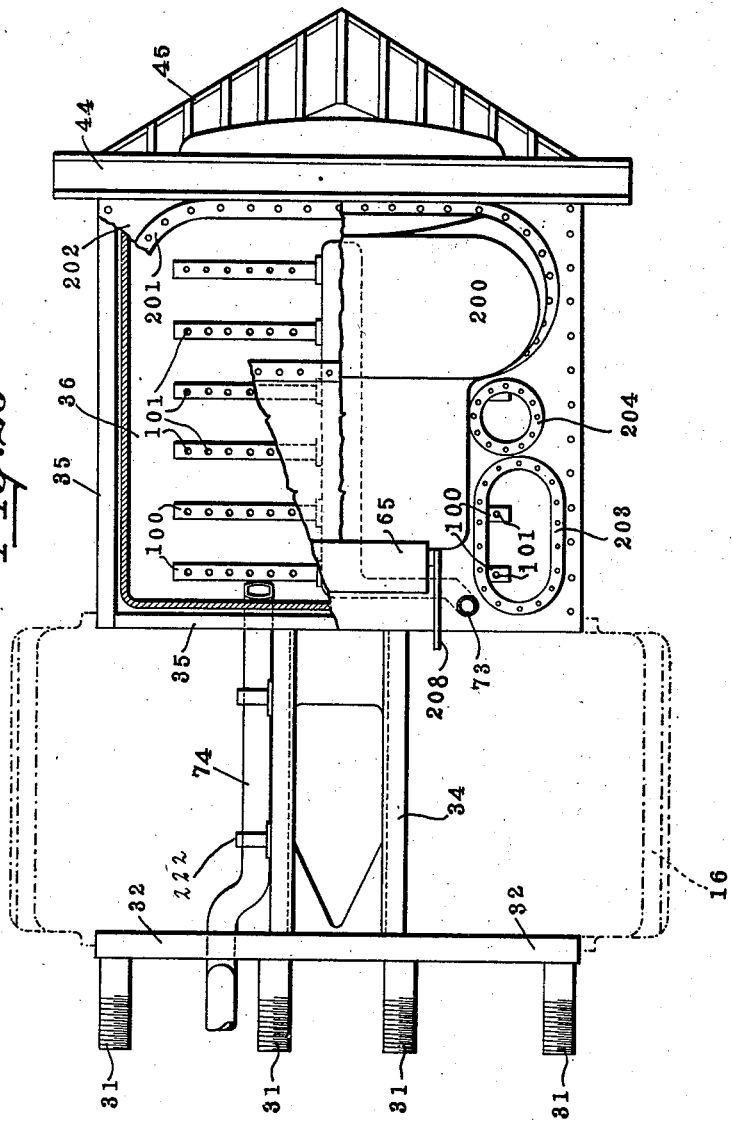
INVENTOR
William W. Fraser
BY
Mayer, Warfield & Watson
ATTORNEYS

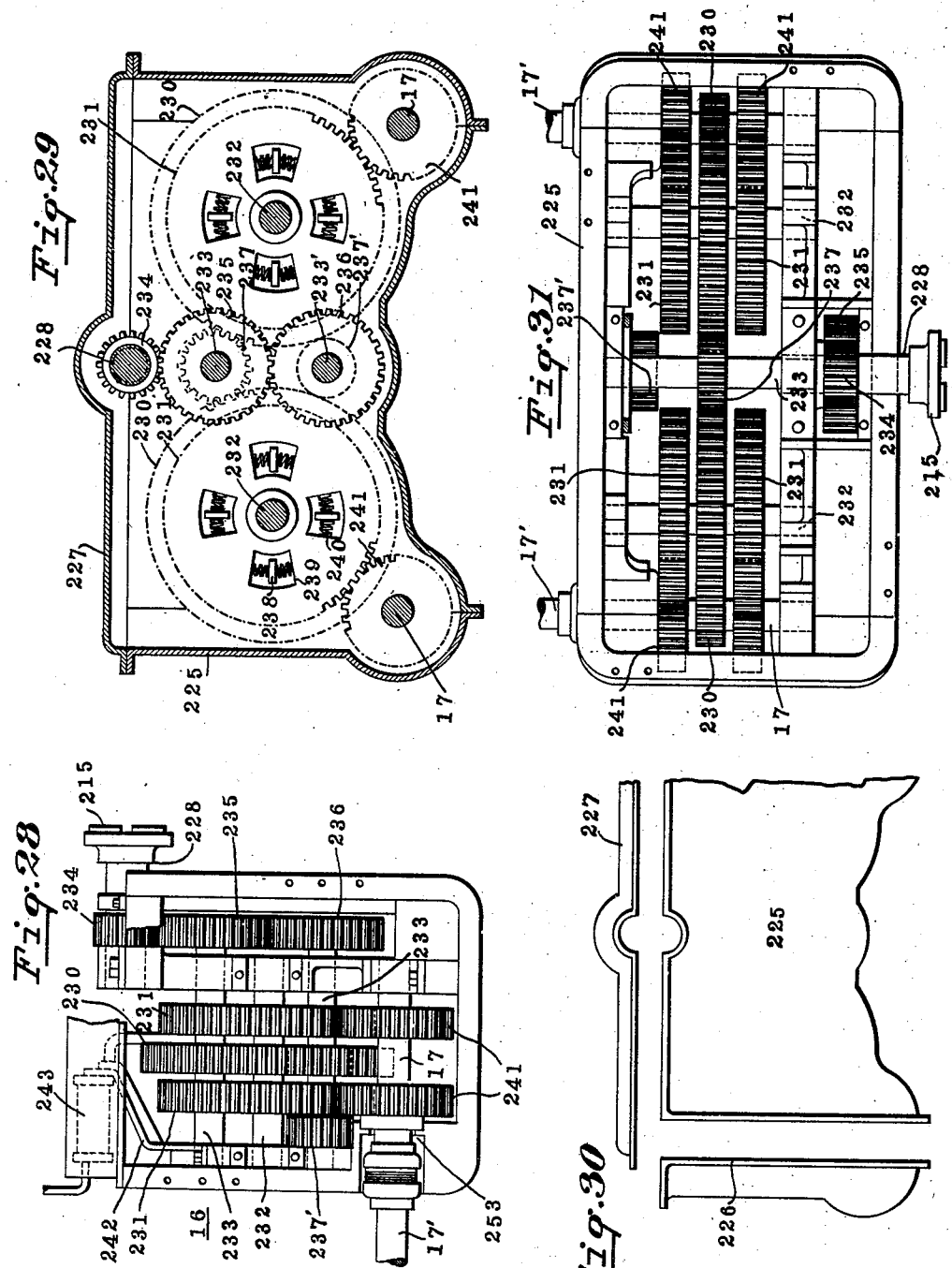

May 6, 1930.  W. W. FRASER  1,757,242
TURBINE LOCOMOTIVE
Filed May 8, 1925  19 Sheets-Sheet 13
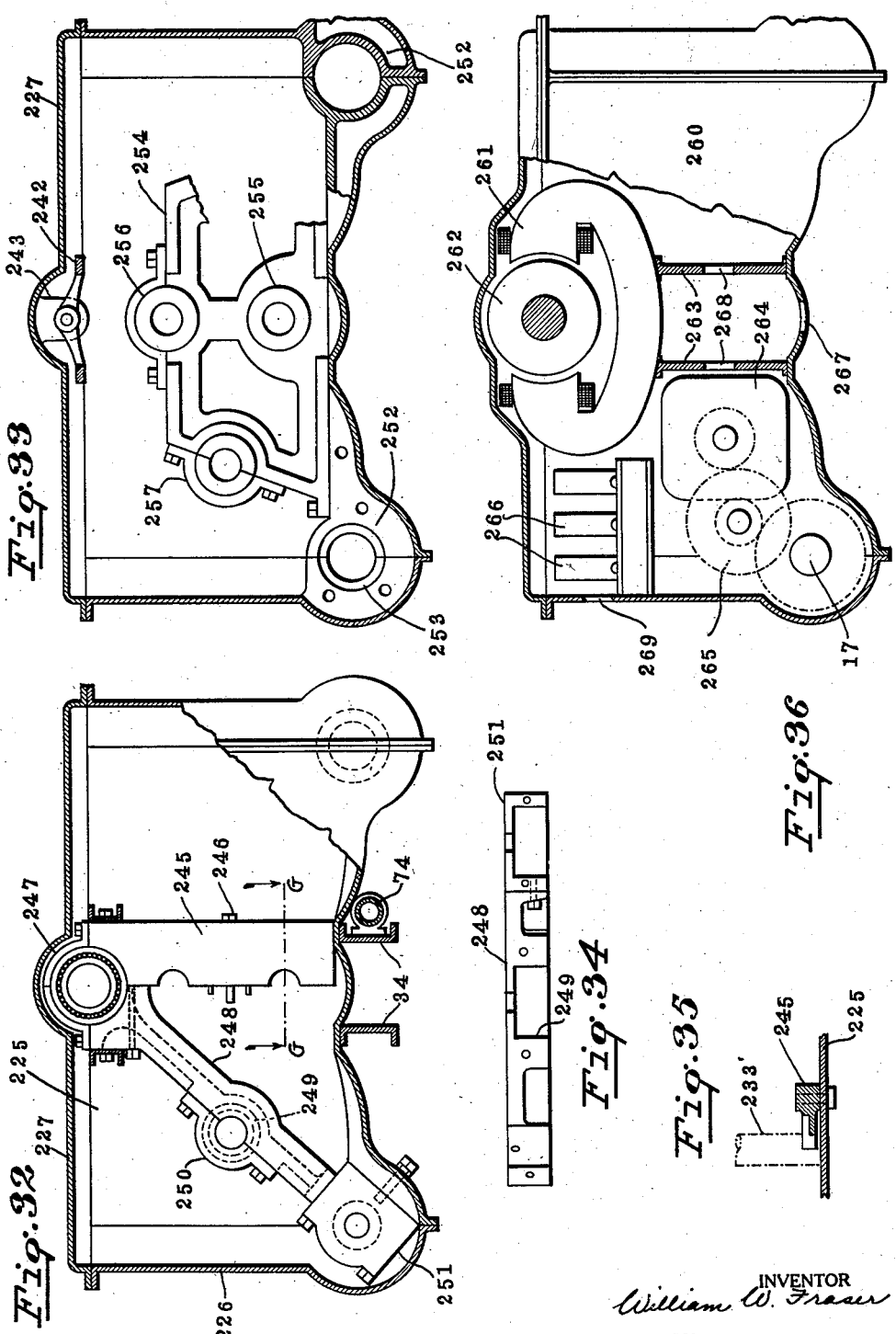
INVENTOR
William W. Fraser
BY
Mayer, Warfield & Watson
ATTORNEYS May 6, 1930.  W. W. FRASER  1,757,242
TURBINE LOCOMOTIVE
Filed May 8, 1925  19 Sheets-Sheet 14
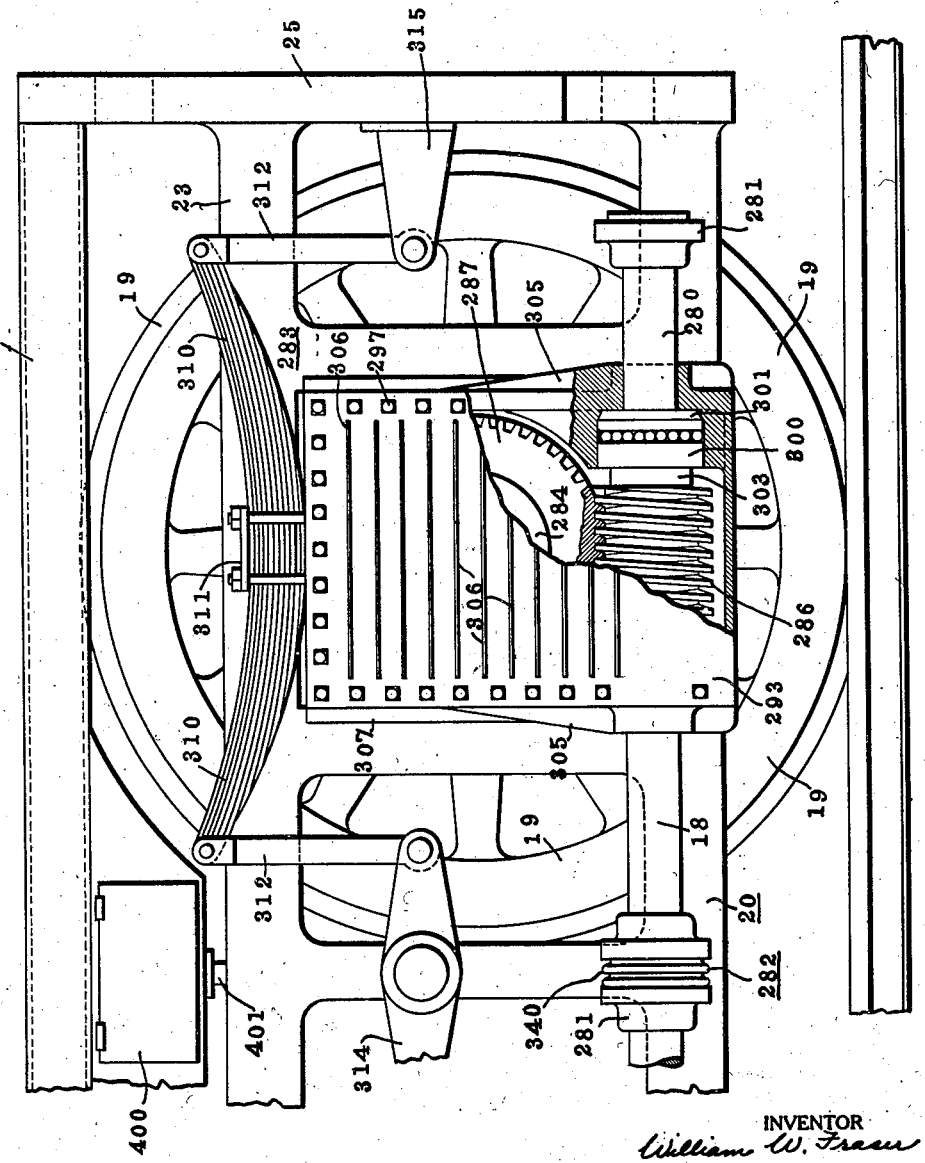

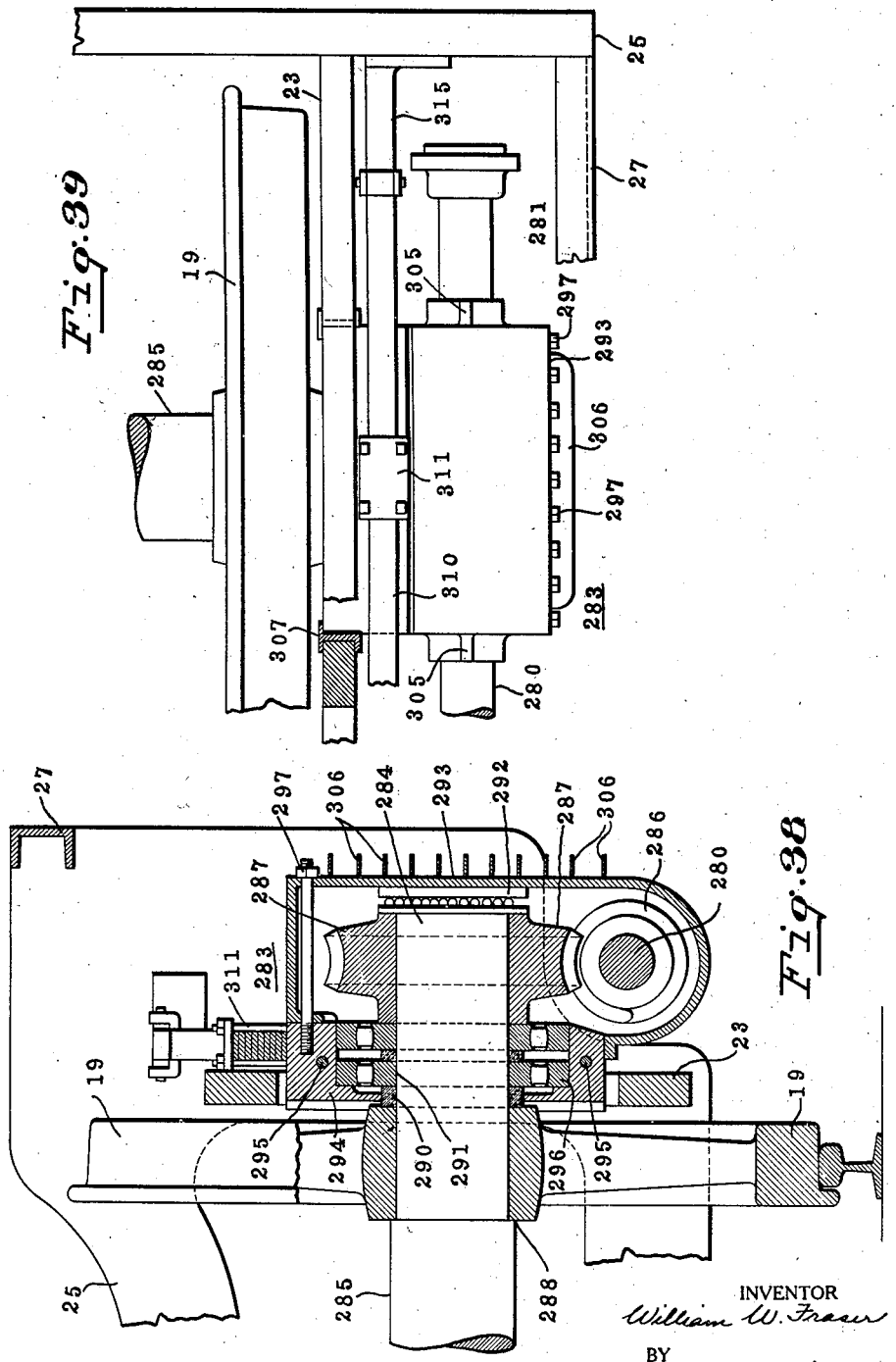

May 6, 1930.   W. W. FRASER   1,757,242
TURBINE LOCOMOTIVE
Filed May 8, 1925    19 Sheets-Sheet 16
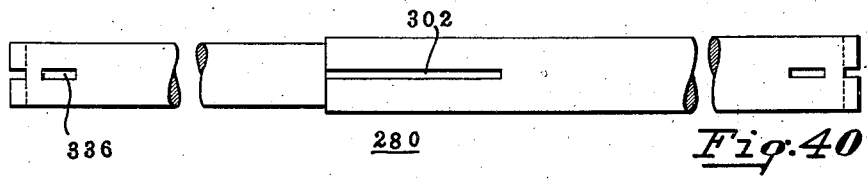
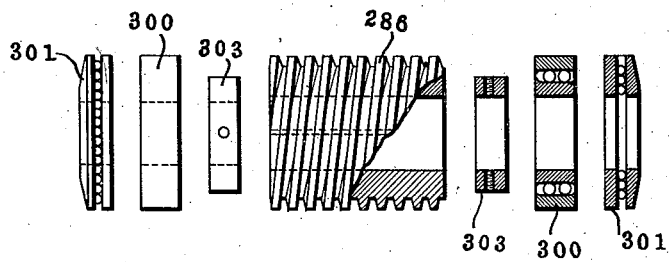
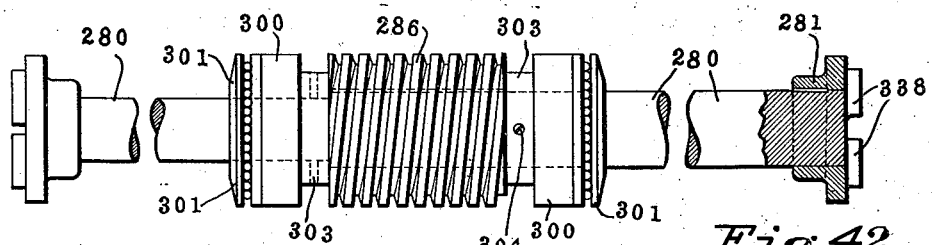
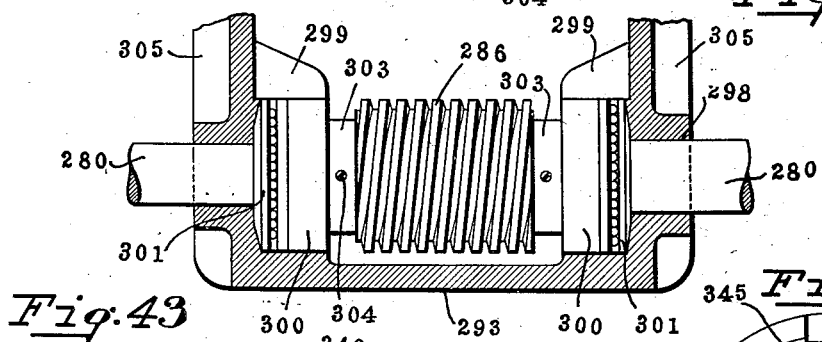
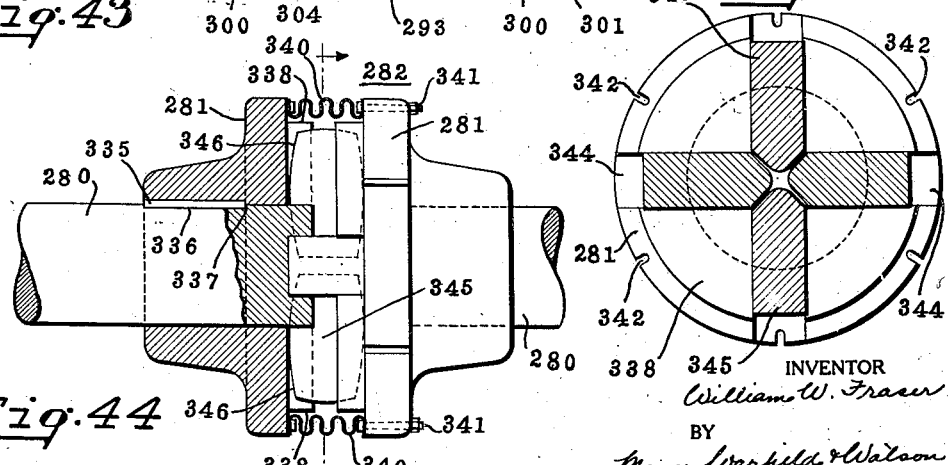
INVENTOR
William W. Fraser
BY
Mayer, Warfield & Watson
ATTORNEYS

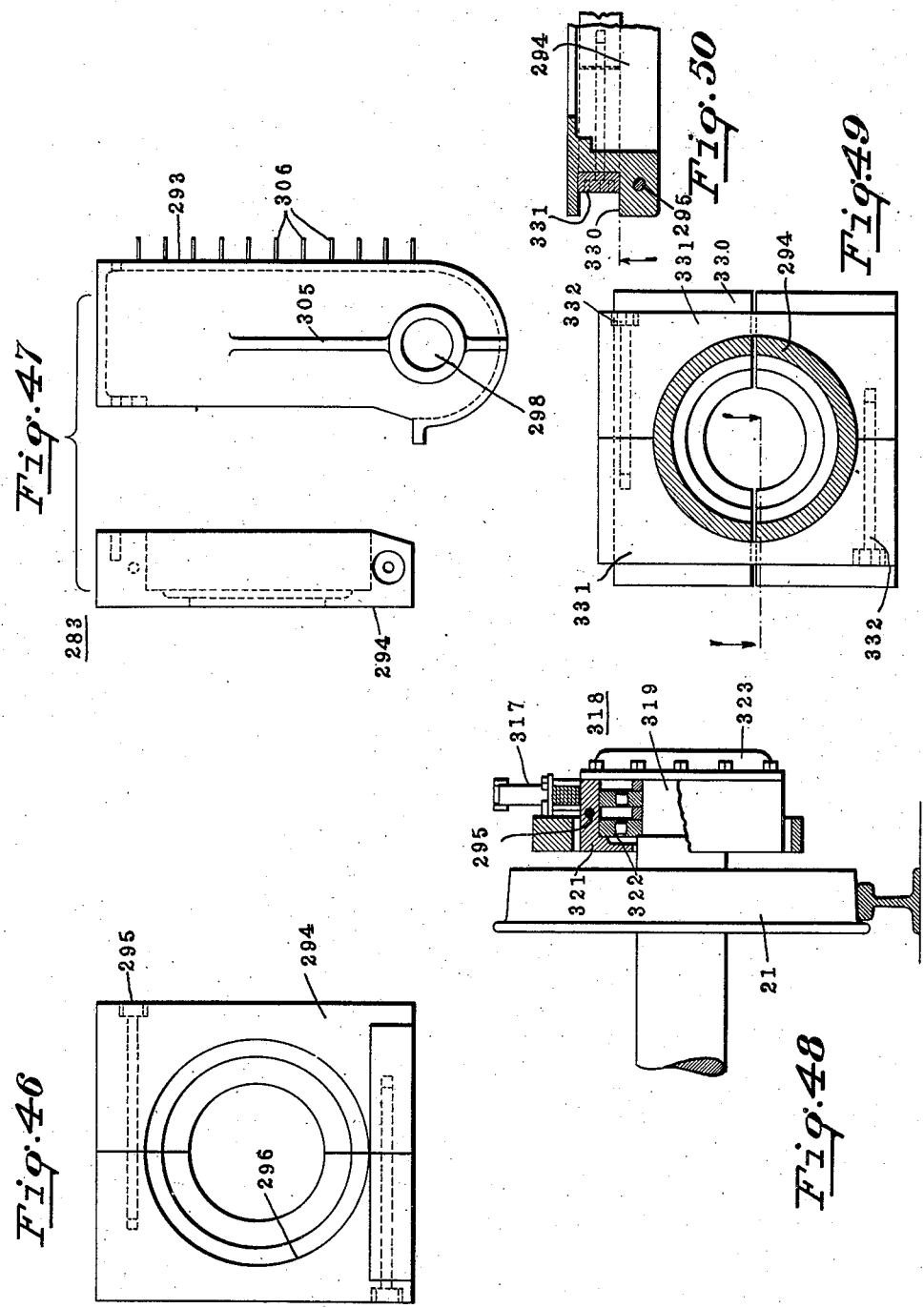

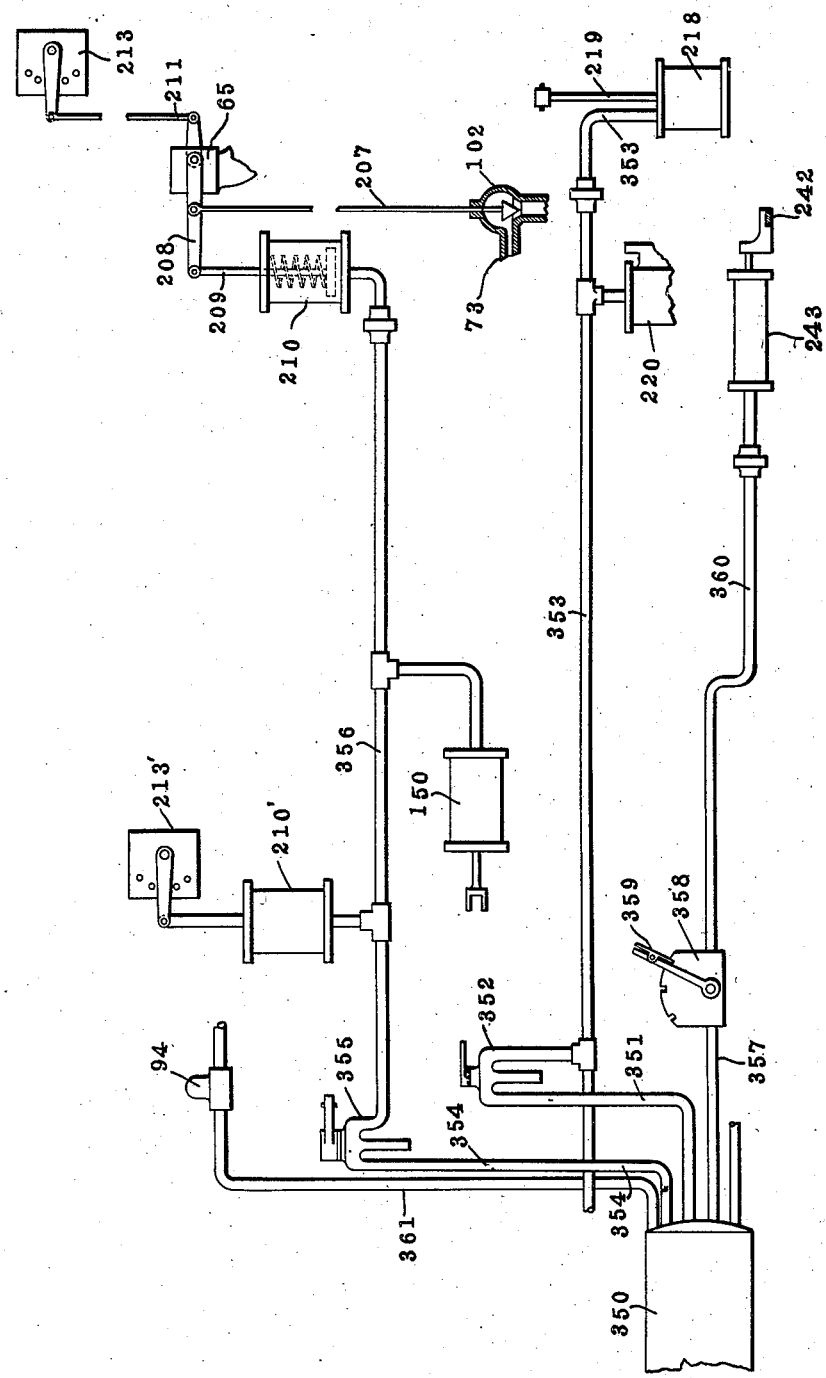

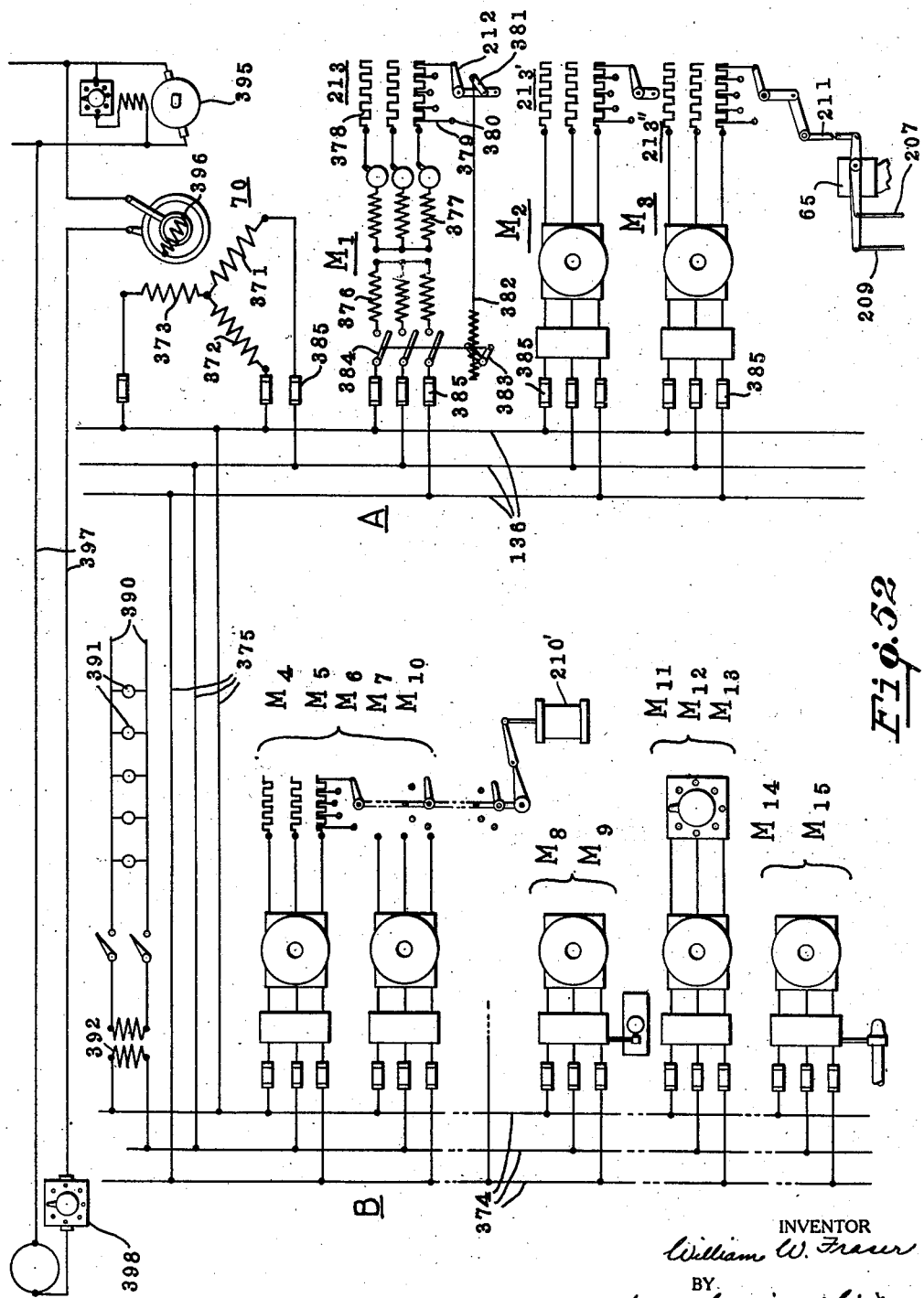

Patented May 6, 1930

1,757,242

UNITED STATES PATENT OFFICE

WILLIAM W. FRASER, OF NEW YORK, N. Y.

TURBINE LOCOMOTIVE

Application filed May 8, 1925. Serial No. 28,769.

This invention relates to locomotives and more particularly to locomotives having turbine engines as the main propelling means.

This invention has for its object generally, to provide an improved construction and arrangement of parts which is efficient, economical and relatively easily manufactured.

More specifically, an object of this invention is to provide a locomotive with an improved construction adapted to yield a machine having a high over-all efficiency; and which, in order to facilitate manufacture, maintenance and repairing, employs the unit principle of construction.

Another object is to provide a locomotive with organs, including a condenser, operating in accordance with an improved heat cycle, and also to provide for the operation of auxiliaries in an economical manner without interfering in any way with the operation or efficiency of the main propelling means.

Other objects of the invention will in part be obvious and will in part appear hereinafter.

The invention accordingly comprises the features of construction, combinations of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawing, in which:

Fig. 1 shows in side elevation, a locomotive constructed in accordance with the invention;

Fig. 4 is a side elevation of the frame for the locomotive;

Fig. 5 is a top plan view of the frame showing an auxiliary portion thereof in detached relation to the main portion, while Figs. 6 and 7 are respectively plan and sectional views of the front truck which is attached to the frame;

Fig. 8 is a view mainly in section, showing the power generating system which is employed in the invention;

Fig. 9 shows the boiler unit in side elevation with the electric generating unit for supplying power to the auxiliaries in detached relation thereto, while Fig. 10 and Fig. 11 are vertical sections thereof taken respectively on the lines A—A and B—B, looking in the direction of the arrows;

Fig. 12 is a sectional view of the front-top-plate which fits over the boiler unit in the neighborhood of the stack, Fig. 13 being a section thereof taken on the line C—C, looking in the direction of the arrows;

Fig. 14 is a schematic view, parts being broken away, showing the operative relation of the several organs of the power system;

Fig. 15 is a view partly in section and partly in elevation of one of the condenser units employed in the power system of the invention, while Figs. 16 and 17 are horizontal and vertical sections thereof taken respectively on the lines D—D and E—E, looking in the direction of the arrows;

Fig. 18 is an enlarged fragmentary view partly in section and partly in elevation of the auxiliary condensate collecting chamber here employed in connection with a condenser unit;

Figs. 19 and 20 are respectively enlarged elevational and sectional views of the condenser tubes employed in the condenser units of the invention;

Fig. 21 is an enlarged fragmentary view partly in section and partly in elevation showing details in the construction of the stoker unit here employed, while Fig. 22 is a fragmentary section taken on the line F—F in Fig. 21;

Fig. 23 is an enlarged detailed view, mainly in section, showing a draft-inducing nozzle of the type here used in connection with the stoker unit;

Fig. 24 shows, in side elevation, an enlarged view of the engine unit as it appears with the auxiliary frame when removed from the locomotive proper and having the main turbine and the gear-casing in place;

Fig. 25 is a similar view showing in side elevation, the removable engine unit when the gear case is removed;

Fig. 26 shows in plan a view of the same unit, parts being broken away;

Fig. 27 shows in end elevation the relation of the valve chest to the main turbine, as employed in the invention;

Fig. 28 is a side elevation of the gear-casing having a side-cover removed to show the gearing, a part also being shown as broken away;

Fig. 29 is a sectional view of the gear-casing taken in a vertical plane perpendicular to that of Fig. 28;

Fig. 30 is a fragmentary front elevation of the gear-casing, the parts being shown in disassembled or exploded relation, while Fig. 31 shows a top plan view of the gear-casing with the top removed;

Fig. 32 is a sectional view similar to Fig. 29 but with the gearing removed, and taken in two planes, the left half thereof being in the plane which shows the supporting frame for the intermediate gearing, the right half showing the front frame;

Fig. 33 is another sectional view of the gear case with the gearing removed but in a plane taken to show the rear frame which supports the gear-shafting;

Fig. 34 is a side elevation of a strut composing the intermediate frame shown in Fig. 32, while Fig. 35 is a section of the front frame shown in Fig. 32 taken on the line G—G.

Fig. 36 shows in section, a modified form of casing used in lieu of the gear-casing when a turbo-electric drive is to be employed in the locomotive;

Fig. 37 is an enlarged view mainly in side elevation, but with parts broken away, showing the journal-housings and the driving gear for the drivers in place;

Fig. 38 is a fragmentary vertical section thereof, while Fig. 39 shows the same in top plan;

Figure 3:
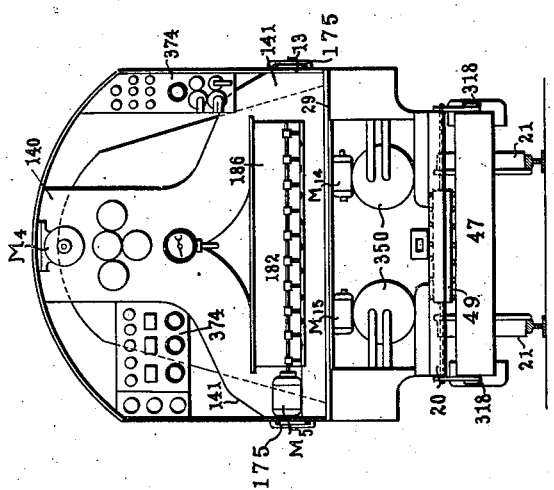
Figs. 2 and 3 are respectively front and rear elevations of the locomotive shown in Fig. 1.

Figs. 40 to 45 inclusive show various details of the driving gear worms and shafting;

Fig. 46 shows in front elevation the two rear members of the journal-housing shown in Fig. 36, while Fig. 47 shows the same in side elevation and associated with its cover member;

Fig. 48 shows a modified form of journal-housing adapted for use on the locomotive trucks, while Figs. 49 and 50 show details of another modification adapted for use on the locomotive drivers;

Fig. 51 shows diagrammatically the connections for supplying power in the form of a fluid under pressure for accomplishing the power control of the engine unit here employed; and Fig. 52 shows, also diagrammatically, a distributing system for supplying power in the form of electrical energy for operating the auxiliaries.

In the practice of the present invention, the various elements and organs of a locomotive are arranged in a plurality of coordinated groups or units, so that the principle of unit assembly may be practiced in order to facilitate manufacture, maintenance and repairing. In this locomotive the engine is preferably of the turbine variety and is associated with its reduction gearing so as to form one of the cooperating units; such unit may need repairing or renewal of the parts more frequently than other parts of the locomotive and accordingly is made preferably readily removable from the remaining locomotive structure.

In order that the engine shall have high thermal efficiency, a special heat cycle is employed, the cooperating organs being well adapted to be carried on a mobile frame, as in locomotives. This heat cycle involves the maintenance of a relatively high vacuum for the exhaust of the turbine and the employment of a condenser. The condenser is preferably air cooled, but in order that it may be an efficient organ in the space available, it employs conjointly several principles of heat dissipation so as to cool quickly the large amount of steam from the turbine, or other engine, by its cumulative effect.

In order to increase the over-all efficiency, heat conservation is practiced; also rolling frictional parts are substituted for sliding frictional parts wherever feasible.

The use of reciprocating parts in propelling the driving wheels has been entirely avoided, whereby the need for counterbalancing or otherwise mechanically compensating for unbalanced forces is absent. Instead of the usual reciprocating side rods, flexibly connected rotating parts are used for transmitting motion of rotation directly to the driving wheels. The driving gear, in order that it may be easily assembled and disassembled, is also composed of suitable units.

The unit principle of construction is further carried out in arranging for the incorporation of the condensers, the boiler, and the stoker, in the locomotive.

In order that the principles which make for thermal efficiency here employed shall be applied to the driving of all auxiliaries, one main auxiliary source of power is provided, preferably in the form of a turbine-driven electric generator, as this at once provides a most flexible and at the same time a most economical means for distributing the necessary power to the auxiliaries. The power for producing the draft is preferably taken from this source; the main driving turbine being thereby relieved of all duty save that of propelling the locomotive which contributes greatly to its efficiency. By this means adequate power for producing the draft is at all times available; the drafting of the locomotive is in consequence made to approach fairly closely to theoretical perfection, as the electric drive for the drafting means is susceptible of relatively accurate regulation in response to the load on the main turbine.

The principle of unit assembly is likewise carried out in providing for the incorporation in the locomotive of the auxiliary source of power and its electrical distributing system.

Figure 2:
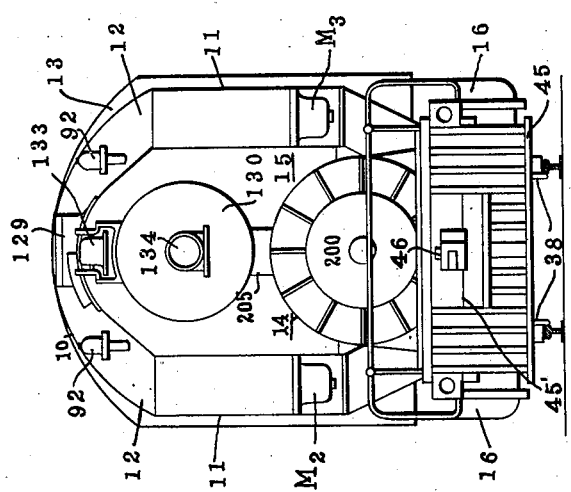

Referring now to the drawings, and particularly to Figs. 1 to 3, 10 denotes the boiler unit of the locomotive which is mounted between two condenser units 11, disposed respectively along the two sides of the boiler and provided with an opening shown at 86 through which air is drawn for cooling purposes by power-operated means, as more fully explained below. The air thus drawn through the condenser is preferably later used for combustion purposes in order to conserve the heat; each condenser in consequence is shown as provided with a conduit 12 for leading the air over the boiler into the cab 13 and thence to the furnace.

The engine unit is disposed at the front of the locomotive and comprises a main turbine 14 having its axis arranged lengthwise of the locomotive; this turbine is arranged to exhaust into both of the condenser units substantially simultaneously by means of exhaust connections 15 which are disposed at each side of the engine-unit. Suitable reduction gearing is provided for the turbine which comprises a gear mechanism located in a gear-casing 16 that extends across the front end of the locomotive at the rear of the main turbine and has two driven shafts 17, one for each side of the locomotive, disposed longitudinally and projecting rearwardly therefrom; these driven shafts are operatively coupled by flexible shafting 18 for transmitting the propelling force to the rail-adapted driving wheels, shown at 19.

*The frame*

The driving wheels 19 are journaled in and support a main portion 20 of the frame which, for simplicity is hereinafter designated the "main frame," and, as shown more clearly in Figs. 4 and 5, is arranged to support a stoker unit, indicated generally at 22, and also a power system as described more fully below. The main frame 20 is shown as composed of two side members 23 which have slotted openings or jaws 24 arranged to slip over journal-housings 283 (Fig. 37) that are preferably disposed in outside relation over the projecting journaled ends of the driving axles.

These side members are secured to a front member 25 and are retained in parallel relation by cross-members 26, preferably so disposed that they may also serve as supports for the structures surmounting the frame. The cross-member 26' is similar to cross-members 26 but is disposed so as to form a main support for the stoker 22.

The front member 25 is extended laterally and upwardly and has projecting, rearwardly from its upper outside edges, two rails 27, which are hereinafter referred to as the "condenser rails" as they each serve to support a condenser unit 11. The rear ends of condenser rails 27 are supported by side extensions of the rear cross-member 26'. There are also provided vertical members 28 which are erected at the rear end of frame 20 and serve to support both the cab 13 and the deck-plate 29.

Associated with the main portion of the frame is a second portion, or "auxiliary frame" 30, shown in Fig. 6 as detached, but which is normally secured to the main frame 20 by convenient fastening means; for example by bolts as shown at 31 that are swaged or otherwise rigidly secured in end-member 32, the latter being formed similar to front-member 25 and arranged to abut thereagainst when the bolts are in place. These bolts are held in the main frame by nuts, such as are shown at 33 in Fig. 1. Extending forwardly from the end-member 32 is a pair of girder members 34, which are disposed relatively close to each other in order to form a saddle-like support adapted to be straddled by the gear-casing 16 (for details see Figs. 24 to 26). Secured to the forward end of the girder members 34 is a rectangular frame 35 which has longitudinal bottom-braces 35', the frame serving as a sort of basket for supporting the castings of a primary exhaust chamber, shown at 36 in Fig. 8.

The auxiliary frame is arranged to have wheeled support independent of the main frame. To this end the auxiliary frame is provided with an engine-truck or bogie 37 which has two pairs of wheels 38 provided with outside journals supported in the truck side-frame 39 in any convenient manner, for example, by means of journal-housings of the type shown in Fig. 48. The side-frames 39 are here shown as united by cross members 40 which are centrally provided with a bearing member 41 adapted to receive the king-pin 42 that is secured to bottom members 35', the bearing member 41 being arranged to afford a limited lateral movement for the truck as well as a swiveled movement.

Across the front of the auxiliary frame is disposed a front-beam 44 to which pilot 45 is detachably secured. A front draw-bar 46, anchored in bottom-members 35' is arranged to extend up through a front opening 45' in the pilot. It is thus seen that the push or pull of drafting from the front end of the locomotive is transmitted directly through members 35' and 34 to the member 32 and thence to the main frame.

A pair of trailer wheels 21 are provided, which have outside journals that support a trailer frame 47 having radius members 47' arranged to be swiveled to a king-pin 48 on the main frame. Between the rear ends of the trailer frame and of the main frame, a member 49 is interposed which preferably has antifriction means such as rollers in contact with the two frames, whereby the swinging of the trailer frame takes place without interferring with its supporting function.

A rear coupling means is also provided, which may be secured to the main frame in any convenient manner, for example, the draw-bar shown at 50 partly broken away.

The power system

The frame, above described, constitutes the supporting means for the power system of the locomotive which functions to transform the chemical energy of fuel burned in the stoker 22 into mechanical power adapted to be transmitted as propelling force to the driving wheels 19. The organs of the power system are schematically represented in Fig. 14; the more detailed arrangement however is shown in Fig. 8. The system here illustrated has an elastic fluid generator in the form of a water tube boiler 10 disposed so as to have its furnace chamber over the stoker 22; this boiler has a fluid circuit composed of a steam drum 51 and a plurality of tubular units 52 and 53. There are three units 52 as shown in Figs. 10 and 11 which are disposed approximately side-by-side which are connected by means of branched pipe-connections 54' leading therefrom to the adjacent header of the unit 53 which latter has its front header connected directly to the steam drum through risers, as shown at 54. The rear headers of the units 52 are connected by short risers 55 to the rear end of steam drum 51. These units, thus arranged, provide the usual "siphon" for the circulation of the water being heated for the generation of steam.

Within the drum 51 is a collector 56 which has a connection 57 leading to the wet steam header 58 on the exterior of the drum. Connections 59 lead from the header 57 to the upper header 60 of the super-heater 61 which terminates in a lower or supply header shown at 62. This lower header is preferably constructed in two parts, one inside the front furnace wall 63, and the other just outside that wall and designated 62'. From the header 62' leads a conduit 64 to the valve chest 65 of the main turbine 14. A second conduit 66 also leads from the header 62' to the valve chest 67 of an auxiliary turbine 68, which is operatively coupled, for example by means of the flexible coupling shown at 69, for driving an electric generator 70.

The main turbine and the auxiliary turbine are preferably both arranged to discharge their exhaust directly into the primary exhaust chamber 36. This exhaust chamber has suitable openings to which the exhaust connections 15 are attached so as to lead the exhaust into the condenser units 11 where it is condensed and then returned as condensate to the boiler through the pipe-connections 73 and 74 by the agency of power-driven pumps, for example, the motor-driven turbine pump shown end-on at 75; the return connection entering the boiler preferably by way of the front header of the boiler unit 53 whereby it serves as a primary heating unit for the feed-water.

The condenser structure

The structure of the condenser units 11 is shown in detail in Figs. 15 to 20. Each condenser unit, as here indicated, comprises a series of lower chambers $80^a$, $80^b$, $80^c$, etc. and a series of upper chambers $81^a$, $81^b$, $81^c$, etc. which are interconnected by means of the condenser tubes 82; a group of tubes being arranged to connect a portion of one chamber with a portion directly opposite of another, the other portion being connected by another group of tubes with another chamber whereby a sinuous passage is provided for the exhaust entering the chamber $80^a$ from the connection 15. This sinuous passage terminates in a final chamber 83 into which the exhaust is drawn from the other chambers by means of a suitable power-driven pump, for example, the multi-stage turbine pump 84.

In order to produce an adequate cooling effect in the condenser for the relatively large volume of steam or other elastic fluid exhausted from the engines, a plurality of principles of heat dissipation are applied conjointly. The principles preferably applied are as follows:

(a) Employment of a cooling medium circulated at a relatively high velocity;

(b) Employment of a maximum cooling surface with a minimum of surface friction, this being accomplished by segmentizing or subdividing into parts one or both of the streams of the separately moving media; as the passage of medium to be cooled and of the cooling medium, as here employed, can be represented mathematically, in hydromechanics, by conjugate functions, such type of passage for streams of moving media will in consequence be hereinafter referred to as a "conjugate passage" of the media;

(c) Employment of impacting means to remove globules of condensate held in suspension in the exhaust;

(d) Employment of a vacuum in the series of condenser chambers;

(e) Employment of pressure in the final chamber together with heat dissipating means;

(f) Employment of surface exposure of cooled condensate directly to the exhaust from the engines in order to reduce initially the volume of the exhaust admitted to the condenser and at the same time conserve the heat thereof, for example, by heating the feed-water.

It will be understood that it is by no means essential to the practice of this invention that all these principles be employed at the same time in any particular instance.

In order, however, to provide means for effecting the application of these principles, the tubes 82 are surrounded by a wall 85 to form a passage for the cooling medium, which is preferably air. The air for this purpose is drawn from the atmosphere through the opening 86 adjacent the chamber 83; the coldest air thus impinges upon the coldest tubes 82, and progresses to the warmer tubes as it becomes heated, thereby insuring a proper temperature differential between the cooling medium and the cooled medium at all points in their conjugate passage. At the forward end of the condenser unit, a motor-driven fan 87 is provided to draw the air through the passage between the walls 85, the air thus drawn being discharged into the superposed conduit 12, by which it is led to the cab in order to be utilized in the process of combustion. The fan 87 is preferably of the turbine variety and is arranged to move the air through these passages at a relatively high velocity.

The stream segmentizing means is preferably applied in both the passage for the cooling medium, in this instance air, and in the passage for the medium to be cooled, which in this instance, is exhaust steam; the means here shown are fins 88, disposed on the exterior of the tubes 82 and arranged to project into the air-conducting-passage, and fins 89, disposed on the interior and arranged to project into the steam-conducting-passage. The fins, thus projecting into the passages, divide the same into cell-like subdivisions extending in the direction of the stream lines and greatly increase the area of the heat-transferring surfaces.

The impacting means for removing globules of condensate from the stream of exhaust steam, is here shown in the form of a plurality of surface devices 90 (see Figs. 15 to 17) arranged to depend from the top walls of the chambers 80$^a$, 80$^b$, etc. and 81$^a$, 81$^b$, etc. and also preferably arranged to extend somewhat obliquely across the line of flow of the moving medium. These surface devices are with convenience given a triangular form sloping toward sinks 91, preferably centrally disposed in each of the chambers 80$^a$, 80$^b$, etc. and 81$^a$, 81$^b$, etc. for collecting condensate. The sloping edges of the surface devices 90 thus serve as guides for quickly collecting the condensate, as the globules collecting thereon will, on account of the energy of their surface tension, adhere thereto and gravitate toward the sinks 91.

The means for evacuating the chambers 80$^a$, 80$^b$, etc. and 81$^a$, 81$^b$, etc. is the turbine pump 84 which produces a relatively low pressure in the series of exhaust chambers including the primary exhaust chamber 36 so that the main and auxiliary turbine engines exhaust at a pressure materially below atmospheric, thereby increasing their thermodynamic efficiency.

The turbine pump also serves as the means for creating pressure in chamber 83, since it discharges the exhaust, when evacuating, into this final chamber which is substantially closed except for the automatic vent valve shown at 92. The uncondensed remnant of the exhaust thus drawn into the final chamber 83 at a relatively high pressure is quickly condensed in accordance with a well-known law of physics. In order, however, further to accelerate this ultimate condensation of the exhaust-remnant, the chamber 83 is preferably further provided with a plurality of globule-collecting and heat-dissipating surface devices 93. As shown, these devices are a plurality of sheets disposed in generally vertical planes, but arranged somewhat obliquely to the planes of the side walls.

The chamber 83 is also provided with an automatic admission valve 94 leading from a suitable source of fluid under pressure, for example a reservoir of compressed air. The valves 92 and 94 thus function to provide an initial and substantially constant pressure within this final chamber.

The chamber 83 is preferably arranged to be the ultimate reservoir for the condensate produced in the condenser. The sinks 91 are accordingly provided with pipe connections 95 leading to an auxiliary condensate collecting chamber 96, (for details see Fig. 18), which has also a vent connection 97 leading from the top thereof to a region of the exhaust passage that is substantially at or of somewhat lower pressure than the sinks 91; thus there is avoided the trapping of air within the chamber, and at the same time the condensate system is made conducive to the collection by gravity of condensate therein. Communicating with the chamber 96 is a discharge connection 98 having a power-driven pump 99 for pumping the condensate from the chamber 96 into the final chamber 83; the power for driving pump 99 being preferably provided by an electric motor, such as shown at M$_8$ which is controlled by float 99' in the chamber 96.

As indicated in Fig. 14, there is a connection 73 which is tapped into the lower part of the final chamber 83 and communicates with the connection 74 to return the condensate to the boiler. The returning condensate is preferably made to return by way of the primary exhaust chamber 36 and to be there exposed so as initially to cool the exhaust, reducing its volume, and thereby conserve a portion of the heat. The chamber 36, as shown, is provided with conduits for this purpose, which preferably include a grid of piping 100, disposed over the bottom of the chamber 36, provided with spraying nozzles 101, and arranged to receive condensate from the connection 73. A valve 102 controls the supply of condensate from the connection 73 to the nozzles 101.

The pressure in the final chamber 83 provides a suitable pressure head to produce the flow of spray from the nozzles 101 when the valve 102 is open. The vacuum pump 84, in drawing over the exhaust from chamber 36, operates to increase the pressure differential which produces the flow.

The sprayed condensate, augmented by an initial amount of condensate condensed directly from the exhaust within the chamber 36, collects on the bottom of the chamber from whence it is drawn by the connection 74 and forced by the pump 75 into the boiler.

In Fig. 14 the connection 73 is shown as provided with a branch-connection 103 having a power-driven turbine pump 104 therein, which leads directly to the boiler. This branch-connection provides an alternate path for the return of the condensate to the boiler and also serves as a ready means for quickly restoring the boiler water level in case the return by connection 74 for any reason is inadequate.

Another connection is shown at 105 which is preferably provided for returning condensate to the final chamber 83 in case the primary exhaust chamber 36 should accidentally become flooded with condensate. To this end the connection 105 is shown as having a power-driven turbine pump 106.

A connection 107 having a turbine pump 108 is also shown for the purpose of introducing initially, or otherwise, the proper amount of water into the system here shown.

*The furnace construction*

The boiler proper here includes the steam drum 51 together with the tubular units 52 and 53, and is housed in a furnace structure constructed so as to be adapted for mounting on the frame 20 as a unit. To this end a framework is provided about the boiler elements into which the furnace walls are built. As shown, this framework comprises a pair of upper side beams 110 and a pair of lower side beams 111 between which are interposed supporting columns 112. A constricted lower portion 113 of the furnace depends from the two lower side beams, as shown in Figs. 9 to 11; the walls thereof being supported by the cradle beams 114 which extend transversely to and are supported from the beams 111. Near the centre of the bottom wall of the constricted portion 113 is an opening for cleaning purposes, which is closed by a suitable plate 115. The front end wall of this constricted portion is shown at 113' in Fig. 8, disposed just in advance of the front header of the boiler unit 53.

The lower beams 111 as well as the upper beams 110 project forwardly beyond the end wall 113' and have built into them an elevated bottom wall 116 (see Fig. 8) and a front wall 117. These walls thus enclose a chamber in advance of the boiler units in which the drafting mechanism is preferably housed, this chamber being hereinafter designated as the "breaching chamber."

The rear end of the furnace, here exemplified, extends into the cab 13, the lower portion being distended, as shown in Fig. 10, so as to fit over a wide upper portion 22' of the stoker which is clearly shown in Fig. 5. This distended portion is provided by means of four obliquely extending columns 118 and 119, which depend from beams 110. A door frame 120 is inserted between their lower ends, and has a manhole door 121 therein. Between the oblique column 119 and the rear column 112' is inserted a triangular wall portion 122, the lower edge of which is supported by obliquely disposed beams 123, which extend downwardly and inwardly from the door frames 120 at an angle adapted to fit upon the inwardly tapered portions 167 of the stoker walls. The direction of beams 123 breaks at 124, from which points the portions 125 continue in parallel relation, but terminate upon reaching the bottom wall 113. By this construction, the furnace has an open lower end adapted to fit on the walls 165 of the stoker. A rear wall, shown at 126 in Fig. 8, supported by the columns 118 and door frames 120, completes the furnace chamber, save for the top. The steam drum 51 is arranged to be supported from the beams 110, and has the top covering 127 arched thereover and supported by the beams 110. A front top section 128 of this covering is made independent of the balance of the covering and is arranged to enclose the breaching chamber. This section carries the stack-funnel 129 and is preferably made in the form of a removable unit and, as shown in Figs. 12 and 13, extends some distance beyond the front wall 117 to provide a support for the front dome-shaped plate 130 which has a flange 131 adapted to be removably secured to the front of the section. In order that this support shall be the more secure, the front wall 117 also has a pair of triangular brackets 132 secured thereto, the ends of which provide further securing means for the flange 131.

The front plate 130, as shown in Fig. 1, provides convenient support exteriorly for a bell 133 and a headlight 134, while interiorly it supports a frame 135 on which the auxiliary turbine 68 and the electric generator 69 are mounted. A set of bus bars for the electrical generator are shown at 136 mounted beneath a panel opening 137 near the front of the front top section. The cables from the electrical generator (not shown here in the interests of clearness) are detachably connected to the busses 136. The electrical generating system exclusive of connections may thus be put in place or removed as a unit from the locomotive by removing the front plate 130 with its attendant devices.

Up at the sides and down over the rear end of the boiler leads the air conduit 12, which spreads out laterally over the rear end of the boiler, as shown at 140 in Fig. 8 and is branched into two conduits 141 leading respectively over and down at the sides of the manhole doors 121 to supply air to the wind chamber of the stoker, as more fully described hereinafter. Associated with this conduit is a power-driven suction fan 142 for accelerating the draft as it enters the down-portion of the conduit.

Within the furnace chamber a horizontal partition 143, having a depending portion 144 extending toward the grate bars of the stoker, divides the furnace chamber into two main paths for the products of combustion. To support this partition, an intermediate beam 145 is provided in the framework at each side of the boiler. The upper passage preferably contains a smaller portion of the heating surfaces than the lower passage which contains the superheater 61; the upper passage is preferably arranged to communicate directly with the stack 146.

The entry of the hot gases to the lower passage is controlled by the superheater dampers 147 which are preferably hinged along the edge-walls 165 of the stoker 22; the hinge-rods 148 of these dampers projecting downwardly through the furnace wall and terminating in cranks 149 which are actuated by the power cylinder 150, as more fully explained hereinafter.

The length of this lower passsage is somewhat increased by the insertion of the baffle 151 which depends from the partition 143 across the superheater 61.

The draft through this lower passage is preferably an induced one, for which purpose a suction-fan 152 is shown disposed at the end of this passage exhausting in the funnel-passage 153 that is disposed like an injector nozzle for discharging into the stack 146 and thereby accelerate the draft through the upper passage. This fan is power-driven, for example, by an electric motor, as shown at $M_1$ mounted exteriorly on the front wall of the furnace chamber. Such motor is connected to be supplied with electric power from the busses 136 and is controlled automatically to respond to the load on the main turbine 14, in a manner more fully described hereinafter. It is thus seen that the furnace has two substantially parallel passages for the hot gas; one, namely the top one, through which the flow is more or less constant providing the heating surface for the more or less constant part of the load, such as that of the auxiliary turbine; the other, or lower, passage having draft-controlling means whereby the heating effect is varied in accordance with a variable load on the main turbine.

The boiler is preferably provided with a safety valve 155 of the usual type so as to permit the escape of excess steam in case the heating effect at any time does not subside immediately in response to a decrease in the load.

The stoker

The furnace may be fired by substantially any convenient form of stoker. The form here employed is shown in Figs. 8 and 21, and is preferably arranged to burn relatively fine or comminuted coal under a relatively steady draft. Here the stoker 22 has a base member 160 mounted on the transverse beams 29' of the truss-frame 28. This member extends the full width of the cab and terminates at each end in upturned ducts 161 into which the down-turned ends of conduits 141 lead. These ducts thus provide means for supplying air for draft purposes to the wind-chamber 162 within the member 160. The wind-chamber is continued in a downward direction by providing a downwardly extending bottom wall 163, as a continuation of its bottom, which wall is supported by obliquely disposed beams 164, supported at their upper ends on one of the transverse beams 29' and at their lower ends on the rear cross-member 26. Walls 165 provide enclosing sides for this extension of the wind-chamber. These walls continue as extensions of the sides 166 (see Fig. 22) of the member 160, then taper inwardly rather abruptly as indicated at 167 until a width substantially that of the depending furnace portion 113 is attained. This width is attained at the point indicated at 168 from whence the walls 165 extend downwardly in parallel relation until the cross-member 26 is reached, where they are terminated by a breast-wall 169 closing the lower end of the wind-chamber and disposed transversely along the cross-member 26.

A top wall 170 in the member 160 roofs over the horizontal portion of the wind-chamber, the upper surface of which wall forms a fuel-platform for the coal which is to be fed onto the grate-bars 171. These grate-bars are shown as perforated stepped members extending from the edge of the fuel platform to the breast-wall 169. Some of the grate-bars, must, of course, terminate upon the tapered portions of the walls 165 thus providing a wide upper grate surface for the stoker heretofore designated 22'.

A hinged plate 172 forms part of the bottom wall of the wind-chamber 162, the free edge of the plate being adapted to be drawn up snugly against the bottom edge of the wind-chamber's rear wall by a hand-operated screw 173 arranged to turn in the nut 174 secured in the deck plate 29. The wind-chamber thus has adjustable means admitting of the escape of excess air therefrom.

A removable handhole cover 175 is provided in the outside end wall of each duct 161. This cover is preferably accessible from the outside of the cab 13 in order to afford engine-house attendants and the like ready access to the wind-chamber 162 for cleaning and other purposes.

In the rear wall of the member 160 is disposed a plurality of air injector nozzles 176 (for details see Fig. 23), to which fluid under pressure, for example steam, is admitted at will by the valves 177 associated therewith. As the wind-chamber is designed to have air under pressure therein, the air valves 176' of nozzles 176 are normally closed, but are opened when the valves 177 are opened. These nozzles are adapted to entrain air from the outside atmosphere into the wind-chamber 162 for draft purposes and thereby supplement, when needed, the air supplied by ducts 161.

Superposed on the member 160, and fitting snugly between the ducts 161, is a second member 180, whose rear wall is preferably made flush with the rear wall of member 160. This second member is formed with a plurality of horizontal cylindrical openings 181, in which reciprocate cylindrical plungers 182 that are connected to crank-shaft 183 by pitmen 184, the crankshaft being driven by any suitable means, for example, the gearing indicated by the pitch-circles shown at 185, that is power actuated, for example, by an electric motor as shown at $M_5$.

Above the second member 180 and below the branched conduits 139 is a fuel hopper 186 which extends substantially across the face of the furnace in the cab, and has passages 187 for feeding fuel leading from its bottom to each of the cylindrical openings 181. When the crankshaft retracts any plunger 182 sufficiently to open its passage 187, a charge of fuel passes from the hopper into the cylindrical opening 181 which the subsequent movement of the plunger pushes out upon the fuel platform 170 where the green fuel begins to coke from the heat radiated directly thereto from the hot gases in the furnace. Subsequent charges pushed out upon the fuel platform result in the first described charge being pushed step by step, and becoming better coked, until it is ultimately moved onto the grate bars 171 where it is consumed in the presence of the draft of air issuing from the wind-chamber. The fuel continues moving downwardly step by step in the process of combustion until as ash it falls over the breast-wall 169 at the lower end of the grate-bars into the ash receptacle 188 which is arranged to depend between the driving wheels 19 and their axles.

In order to accelerate the coking and assist in the combustion of the volatile hydrocarbons evolved by the heat from the green fuel on platform 170, there is provided a second set of injector nozzles 189 which are similar to nozzles 176 and are disposed in the lower edge of the conduits 141 and arranged to project through the furnace wall 126 into the combustion chamber. These nozzles are supplied with fluid under pressure, for example, steam, at will under control of the valves 190 and are adapted to entrain secondary air from the conduits 141 directly into the combustion chamber, discharging it onto the green fuel above the grate-bars. By this means substantially smokeless combustion may be had at all times.

*The engine unit*

The engine unit including the auxiliary frame 30 is shown on enlarged scale in Figs. 24 to 26 as removed from the remainder of the locomotive structure. Here the main turbine 14 has its enlarged exhaust end 200 disposed forwardly and secured over a suitable opening 201 formed in the top plate 202 of the primary exhaust chamber 36. This top plate as will be seen from Fig. 26 has two openings 203 at its rear to which the exhaust connections 15 are attached to lead the exhaust into the condenser units 11. Between the openings 201 and 203, on each side of the top plate is another opening 204 for receiving exhaust from the horseshoe-shaped exhaust pipe 205 which has a nipple 206 for connecting with the exhaust opening of the auxiliary turbine 68.

The primary exhaust chamber, as here shown, is conveniently made in the form of a tub-shaped rectangular casting, which, when covered by the top plate 202, is adapted to be supported by the basket-frame 35. At a convenient point near the rear edge of the top plate the pipe connection 73 is passed through to supply condensate to the gride of piping 100. The pipe connection 73 passes in front of the gear box; at a point somewhat above the gear-casing, the valve 102 is conveniently interposed. This valve has a stem-operating connection 207 leading to the valve-lever 208 which is operated by a connection 209 extending from the power-cylinder 210. The valve-lever 208 is also shown as extended so as to operate the connection 211 leading to the controller-arm 212 of the controller 213. This controller, as indicated in Fig. 8, is conveniently mounted on the lower inside edge of the flange 131 and is adapted to control the draft motor $M_1$. (As the motors $M_2, M_3, M_4, M_5, M_6$, $M_7$ and $M_{10}$ are subject to the same control conditions as motor $M_1$ the controller shown at 213 may be taken as symbolic of the whole system of controllers for these motors which are similarly operated.) It is thus seen that, when the valve-lever 208, which actuates the admission valves 65' (see Fig. 27) in the valve chest 65, is operated by the power cylinder 210, the valve 102 and the controller-arm 212 are simultaneously operated and moved to a corresponding extent so that the flow of condensate into the primary exhaust chamber and the response of the draft motor (and of the others similarly controlled) shall be substantially proportioned thereto.

The main turbine has a coupling 215 for transmitting power to the gearing within the gear-casing 16, which coupling is provided with a brake drum 216 substantially encircled by a brake band 217 that is arranged to be applied thereto for a braking application through the instrumentality of power cylinder 218, having an operating connection 219 for this purpose. The power brake-cylinder 218 is mechanically independent of the main brake cylinders 220, (shown in Fig. 5, but with the brake rigging omitted in the interests of clearness) though preferably arranged to be actuated by fluid under pressure supplied by the same brake pipe, as described more fully below, in order properly to coordinate the operation of the main brake cylinders 220 with the brake drum cylinder 218.

The connection 74 for feeding the condensate to the boiler unit 53 is shown in Fig. 26, and leads from the bottom of the casting under the edge of basket-frame 35 along the outside of a girder member 34. This member, as shown, has means 222 for supporting this connection.

*The gear box*

The gear-casing 16, which is adapted to be mounted upon the girder members 34, of the auxiliary frame, is shown in detail in Figs. 28 to 31. The casing proper is preferably composed of four members, namely a body member 225 which is U-shaped in vertical longitudinal section, two side members 226 and a top member 227. The body member and the side members together form a deep receptacle in which to dispose reduction gearing.

The reduction gearing, here illustrated, is preferably symmetrically disposed in the two sides of the receptacle and arranged to transmit substantially equal torques to driven-shafts 17 from the common countershaft 228, which is coupled mechanically by the coupling 215 to be driven by the main turbine 14 when the gear casing is in place. The arrangement for thus transmitting substantially equal torques to the two driven-shafts 17 is accomplished by providing intermediate gears 230 and 231 on common intermediate shafts 232 journaled in the casing and arranged to be driven from either of a pair of main shafts, the upper of which is denoted 233, the lower 233'. These main shafts are arranged to be constantly driven from the countershaft 228 by the provision of the train of intermeshing gears 234, 235 and 236 which are respectively on the shafts 228, 233 and 233'. By this arrangement the shafts 233 and 233', while revolving at substantially the same R. P. M., have opposite directions of rotation; the gear 234 being smaller than gear 235 constitutes the first speed-reduction stage.

On each of the main shafts is a spur gear indicated respectively at 237 and 237'; these spur gears are adapted to be slid at will into engagement with the intermediate gears 230 which are not keyed but are arranged to turn freely to a limited extent upon intermediate shafts 232, and are accordingly provided with projecting abutments 238 which extend into corresponding cavities 239 in gears 231 that are keyed or otherwise secured to shafts 232. These abutments, as shown, are resiliently coupled with the gears 231 through the interposition of suitable springs 240.

The gears 231 are made to drive directly the driven-shafts 17 by the provision of gears 241, secured thereon and arranged to mesh with gears 231. As shown, each of shafts 17 and 232 have a pair of intermeshing gears 231—241 which are disposed symmetrically at each side of gears 230 on shaft 232. By this arrangement of gearing a gear-train is provided for driving the driven-shaft 17 which includes a lost-motion element having an increasing yieldable resistance characteristic, which is particularly useful where turbine-drives are employed, since it permits the turbine to start readily and get well under way before taking up the load of propelling the locomitive. While there is a speed increase in the train from shafts 232 to 17, yet since shaft 232 is but an intermediate shaft, we may consider the speed transfer as from main shaft to driven-shaft which involves a speed reduction in the R. P. M. transmitted to shaft 17. This may be deemed the second speed reduction.

Only one of the sliding spur gears 237 and 237' is in mesh with the gears 230 at one time. This is achieved by providing a rigid yet displaceable frame which extends down in between the gears 230 and loosely engages with both gears 237 and 237'. This engagement is such as to permit the gears 237 and 237' to revolve freely but to insure that there is always a predetermined distance between them. This frame is shown in Fig. 28 at 242 and is arranged to be displaced at will by means of the power cylinder which is shown in broken lines at 243.

As the spur gears 237 and 237' have mutually opposite directions of rotation, it is seen that by employing the power cylinder to displace the frame 242, the direction of rotation imparted to the driven-shafts 17 may be reversed at will without need for changing the direction of rotation received directly from the main turbine. The main turbine 14 may thus be a straight one-way turbine without extra stages for reversing; the usual alternative construction of providing a special turbine reserved for reversing duty only, is also avoided, thereby permitting all the engine equipment of the present locomotive to be constantly used at substantially maximum efficiencies.

The shafting above described for the gear-trains of the casing 17, may be journaled in any convenient form of frame adapted to retain the bearings for the several shafts.

The details of the frames here employed are illustrated in Figs. 32 to 35. Here, there is provided a two-part frame, disposed against and supported by the front wall of body member 225, which frame is composed of abutting block-like members 245 having their adjacent edges cut out so as to fit over and hold in proper alinement the bearings of the three shafts 228, 233 and 233'. A bolt 246 is adapted to secure these members together at a middle point while at the top a pillow-block crown-member 247 spans these members and, with them, provides one bearing support for the countershaft 228.

The inverted V-frame shown on the left in Fig. 32 is the intermediate frame which provides at its apex a support for the second bearing of countershaft 228. At an intermediate point, each leg 248 of this frame is hollowed out, as shown at 249 to receive an end bearing of an intermediate shaft 232, such being held in place by a cooperating crown-member 250.

At the lower end this leg 248 is secured directly to a pillow-block bearing member 251 which serves as a bearing support for the inner end of driven-shaft 17. The casing 16 is itself preferably arranged to provide the other bearing support for shaft 17 without the aid of a frame structure. To this end it is provided with the hollow bridge formation shown at 252 having a depending rib 253 which serves as a stop for the bearing proper. Beyond this rib, the shaft 17 is provided with an articulated end 17' by means of a flexible coupling as described more fully below.

For the support of the rear ends of the two shafts 232 and of the shafts 233 and 233' there is provided a trapezoidal frame 254 disposed against the rear wall of casing 16. In each side of this frame there is a bearing-supporting arrangement as shown respectively at 255, 256, 257, etc. Each of these frames is preferably made adjustable, as shown, in its respective position to provide proper alinement for the gear-shafting.

The bearings proper, which fit into these supporting frames, are preferably of the anti-friction variety; for example, ball bearings.

The modified form of casing shown at 260 in Fig. 36 is adapted to be employed in locomotives of the so-called "turbo-electric" variety. This may be achieved by the substitution of an electric-gear-reduction device for the above mechanical gear reduction device. For this purpose, preferably high voltage, light weight dynamo-electric machines are housed in a gear-casing of the variety here exemplified. In this manner the desired turbine speed reduction may be accomplished by means wholly electrical instead of mechanical in the space available for the gear-casing. Here there is shown a bi-polar electric generator 261 having a rotor member 262 arranged to be coupled to and directly driven by the main turbine; it is consequently revolved at a relatively high angular velocity such as is adapted for high voltage generation. This generator is mounted on beams 263 disposed centrally within the casing 260 at each side of which there are disposed electric motors 264 having the ordinary reduction gearing, indicated by the pitch-circles 265, for driving at reduced speed the driven shafts 17. Any convenient form of electric control may be employed for these motors; for example a generator field control, which effects the desired motor control without opening the motor circuits. Means, however are shown at 266 indicating control-rheostats which may be regarded as in either the generator field or in the motor supply circuits according to the type of control chosen.

Ventilation of the "electric-gear" casing 260 is preferably provided and is here indicated by the series of openings shown respectively at 267, 268 and 269.

Reversing, in the case where "electric-gearing" is used, is preferably accomplished by the control of the motor field, especially if a D. C. system of electric distribution is employed, this control involving merely the reversal of the field excitation in a well understood manner.

Moreover by reason of the similarity of the "electric-gear" casing to the mechanical gear-casing, and also by reason of the fact that these gear-casings are each adapted to the auxiliary frame and are removable therefrom, the locomotives of this invention become convertible from the straight turbine variety into the turbo-electric variety and vice versa.

The driving gear

The driving gear is arranged for transmitting propelling force from the driven-shafts 17 to the driving wheels 19, as above indicated, and comprises rotating parts involving the flexible transmitting shafting shown generally at 18. The details of this driving gear are shown in Figs. 37 to 47. Here the shafting is shown as composed of sections 280 on each end of which is secured one member 281 of a flexible coupling 282. Each section is rotatably secured and journaled in a journal-housing 283 which is disposed over the projecting journaled end 284 of the driving axle 285, and is arranged to drive a worm 286 which coacts with a worm-wheel 287 secured on the journaled end 284 to propel the driving wheel 19. The worm and worm-wheel within the journal-housing 283 may thus be regarded as secondary driving means.

The driving wheel 19 is first forced onto the journaled end 284 until it abuts the shoulder 288 (see Fig. 38) in accordance with well-known railroad practice, whereby the proper spacing of the driving wheels on the axle is insured. A distance collar 290 is then slipped over the end 284 and one or more bearing members 291 disposed in following relation. In the instance illustrated, two bearing members of the antifriction type are shown in mutually spaced relation but fitting against the distance collar 290. The worm-wheel 287 is shown next but extends substantially to the outside end of the journal-end 284. Besides the bearing members 291, the axle has a thrust bearing 292 interposed between its end 284 and the cover member 293 of the journal-housing.

The journal-housing, as shown in Figs. 46 and 47, preferably has a three-member construction comprising two rear members 294 adapted to be secured in abutting relation by two or more bolts, such as shown at 295. The rear members are hollowed out as shown at 296 to fit over and embrace the bearing members 291.

The cover member 293 is secured to members 294 by bolts 297. When in place, it completes the journal-housing and is preferably made to support the section 280 of the shafting which is associated therewith. To this end the cover member 293 has side openings 298 through which the section 280 is inserted. Interiorly the cover member has formations 299, adjacent the openings 298, arranged to support bearing members 300 and 301; these bearing members are also preferably of the antifriction type, for example, ball bearings; the bearing member 300 are here shown of the radial supporting type, while bearing members 301 are of the thrust type.

The section of shafting, as shown in Fig. 40, preferably has one end reduced by the depth of the main keyway 302. This reduced end is adapted to be inserted first when putting the section in place in the cover member. To accomplish this, the bearing members 300 and 301, and a pair of spacing collars 303 are arranged in proper alinement in and between the formation 299 together with the worm 286 which has its key already in place. The section 280 is then slipped into place. By reason of its reduced end, it will clear the key and is readily slipped through the worm until the shoulder with the main keyway 302 is encountered. The key and main keyway are made to register and the section 280 slipped home when the key will have occupied the whole keyway. Accidental displacement of the section 280 from the cover member 293 is prevented by providing the collars 303 with suitable securing means, for example set screws as shown at 304 which may be driven into secure engagement with section 280.

As one end of the section 280 is reduced, it will be observed that the bearing members and collars at each side of the worm 286 have different bores so as to fit snugly over the two ends of the section.

The cover member 293 with its associated section of shafting, by this construction, is adapted to be put in place or removed by simply manipulating bolts 297 without disturbing the rear members 294 or their relation to the driving wheel or frame. The cover member with its removable parts thus constitutes a convenient unit in the construction of the driving gear.

This cover member, when in place, with the worm 286 being driven to propel the driving wheels, is subject to stresses resulting from the reactions of the driving force being transmitted. When the locomotive is driven forwardly the axial reaction of the worm applies a stress to the forward side wall of the cover member. The cover member is consequently shown as provided exteriorly with strengthening ribs 305 which extend longitudinally down each side of the cover member.

In order to strengthen further the cover member against the stresses resulting from axial thrust against the inner side of the front wall of the cover member through thrust bearings 292, it is provided on the outside with ribbed formations 306 which serve also as heat radiating fins for cooling the journal-housing.

At each side, the rear members 294 are provided with channel members 307 (see Fig. 39) which are rigidly secured thereto and serve as guides and bearing surfaces for the journal-housing when in place in the frame 20.

The driving wheels, with the journal-housings 283 in place on the journaled ends 284 (or more simply with the two rear members only disposed on the journaled ends), are adapted to be slipped into the slotted openings 24 to support the frame. This support of the frame, however, is preferably made to be of a resilient character, and to this end is suspended from the journal-housings by means of springs 310, which are shown as of the usual semi-elliptic type and arranged to bear on the tops of the journal-housings, the rear members 294, in particular. Suitable securing means 311 are shown as disposed over the springs 310 at their mid-points and anchored in the rear members 294 to prevent displacement of the springs.

The frame is attached to the springs 310 by means of equalizing connections, here shown as comprising links 312 which depend from each end of the springs, and equalizing levers 314 which are pivoted to the side members 23 and have their ends connected to the links. The front link of the front driving-wheel is however not connected to an equalizing lever, but is shown in Fig. 37 as connected to a stud 315 which is secured to front member 25.

The rear link of the rear driver is shown in Fig. 1 as connected preferably in a universal fashion to the short arm of a lever 316 pivoted on the trailer frame 47, the long arm being linked to the springs 317 on the journal-housing 318 which is fitted over the journaled end 319 of the trailer axle.

The trailer journal-housing 318 is preferably a modified variety of the journal-housing shown for the driving wheels. A suitable form is illustrated in Fig. 48. Here the housing is composed of a pair of abutting rear members 321 which fit over the bearing members 322 slipped over the journaled end. The springs 317 are made to bear upon these members which are slipped into a wheel supporting slot in the trailer frame 47. The journal-housing is completed by a cover member, which, since it need support no driving mechanism, may be a simple cover of the character indicated at 323.

A similar construction, it will be understood, is adapted for the journal-housing of the wheels 38 on the engine truck 37.

By the type of suspension above described, the journal-housings have freedom of motion in a vertical direction in the frame 20. For some services, however, a greater degree of freedom of motion may be desirable. For this purpose the journal-housing construction shown in Figs. 49 and 50 may be desirable. In this later construction the journal-housing has a five-member construction; the rear member construction being changed from a two-part to a four-part variety, the same cover member being employed in both constructions. To apply the additional members, the two rear-members of the original construction are secured together in operative relation, and a deep annular groove 330 cut therein which is concentric with the hollowed arch portion 296. This groove is wide enough so the sides thereof may serve as the guides for the journal-housing in the frame members 23 without the use of extra channel members as indicated at 307.

Into the groove 330 is fitted a pair of auxiliary arch members 331 which span the annular neck thus formed by the groove on members 294; these arch-members are disposed so as to abut and are secured together by bolts 332 similar to those shown at 295. The arch-members are adapted to have a working fit in the groove 330 and extend outwardly short of the vertical edges of the groove 330 sufficiently to form a guiding groove as indicated in Fig. 50 into which the sides of the slotted openings 24 in the frame may fit.

By this construction, the journal-housings, when in place in the locomotive frame have a degree of motion permitting a turning movement of the secondary driving mechanism about a centre coincident with the centre of the driving axles.

The rear members are shown in Figs. 37 to 47 as separable from each other in a vertical plane, while those shown in Figs. 49 and 50 are separable in a horizontal plane. The former construction permits of a symmetrical design for the two rear members but a consideration of the stresses to which the rear members are subjected may make horizontal separation preferable.

The arch members 331 are shown as separable in a vertical plane for purpose of symmetry as they are subjected to substantially no stresses, these arch members serving merely as a guiding block and collar for the balance of the journal-housing which may be rocked or turned in this block by shearing forces acting across the various sections of the shafting 18.

The flexible coupling

The flexible coupling 282, which has co-operating members 281 on opposite ends of the sections of the shafting so as to transmit driving torque to the secondary driving mechanism, is shown in detail in Figs. 44 and 45. Here a member 281 is slipped over a section-end so as to engage with a key 335 which fits into a slot 336 having closed ends and disposed near the end of the section. The keyway in the member 281 is cut only partially through so that it provides a stop 337 to insure the proper positioning of the member upon the section.

The member 281 has a reducing shoulder 338 about the edge of its front face, which provides a groove in which to mount the bellows-like annular wall-member 340. This annular wall member is made both flexible and collapsible and is preferably permanently secured to one member 281, for example, to member 281 shown on the left in Fig. 44. To the other end of this annular wall member are secured a plurality of pivoted bolts 341 which are arranged to fit into radially formed grooves 342 formed about the edge of the adjacent member 281.

Across the face of each member 281 there is cut a plurality of intersecting key-grooves 344; in the instance shown, the key-grooves intersect at right angles. These grooves are preferably arranged to extend into and be cut across the section-ends, which are made flush with the face of its connecting member.

Into the key-grooves are slipped a plurality of key members 345, which are shown as cut back at 346 along an arc to provide clearance for rolling motion of the coupling members when the sections rock. These key members fit together at their inner ends in dovetailed relation.

The annular wall member 340 serves as a means for preventing these key members from moving out of their grooves under the influence of gravity, centrifugal or other forces. Since the wall-member is also collapsible it may be detached at any time from the companion coupling member 281 and pushed back in order to afford access to the key members 345. Thus the key members may be readily removed, which is preferably done preparatory to removing a unit from the driving gear.

The power control system

The locomotive of this invention preferably utilizes a power system for actuating the various controlling means, so that they may be power controlled as distinguished from a purely manual control. Any convenient source of power, for this purpose may be employed which is auxiliary to main power utilized in propelling the locomotive. An electric generator, here shown at 70, serves as the principal auxiliary source of power. For some purposes, however, a source of fluid under pressure is a more convenient source of power; brake control is a particular instance where such a source is convenient.

A source of compressed air is in consequence provided and indicated by the air drum shown at 350 in Fig. 51; the pressure in the air drum is conveniently maintained by a supply of electric energy from the electric generator 70, as more fully explained below. From the air drum a pipe connection 351 leads to a manual air valve 352, from which a service pipe 353 leads to the brake cylinders 220 on the main frame and to the drum brake cylinder 210 on the engine unit; connections are also preferably provided for service to the train pipes.

A pipe connection 354 leads to an independent manual air valve shown at 355 which controls the supply of compressed air through a service pipe 356 to the power cylinders 210 and 210'. The cylinder 210, as described above, is on the engine unit and is arranged to actuate the valve lever which controls the flow of steam to the main turbine, the flow of condensate to the primary exhaust chamber, and the motor controller shown at 213. Where controllers such as shown at 213', cannot be conveniently disposed on the fore part of the locomotive to be actuated by the power cylinder 210, they may be elsewhere disposed on the locomotive and actuated by the power cylinder shown at 210'. A third power cylinder 150 is also shown as connected to this service pipe for actuating the superheater dampers. As the air-valve 355, by this arrangement, controls the supply of steam to the main turbine, it will hereinafter be referred to as the "throttle".

Another pipe connection 357 is shown as leading to another manual air valve 358, which is preferably so disposed as to have its valve-axis horizontal, and the valve lever projecting upwardly as shown at 359. This air valve controls the supply of compressed air through the service pipe 360 to the power cylinder 243 which is disposed in the gear-casing for reversing the direction of rotation imparted to the driving gear. The lever 359 will in consequence be hereinafter referred to as the "reversing lever".

A fourth pipe connection is shown at 361 for leading a supply of compressed air to the automatic admission valve 94 of a condenser unit.

The electrical distributing system

In this locomotive the principal source of auxiliary power is an electrical generator, shown at 70. The system by which the electrical energy of this generator is distributed to drive the auxiliaries is shown diagrammatically in Fig. 52. Here the electric generator 70 is shown as of the synchronous three-phase variety; the armature windings thereof are indicated respectively at 371, 372 and 373 and are connected to the buss 136 in the front top-section 128. Busses 136 may for convenience be designated more generally the "A"-busses. A second set of busses is preferably provided which may be located in the cab 13 behind a panel as shown at 374. This second set of busses may likewise be designated the "B"-busses. The B-busses are connected to the A-busses by the cable connections shown at 375; these connections are preferably in the form of an armored cable disposed on the outside of the boiler on top of a condenser unit. The motor $M_1$, which operates the draft inducing fan 152, is here shown as of the induction type, having its stator 376 connected directly to the A-busses, and its rotor 377, of the wound type, connected to the controlling resistances 378. These resistances have a plurality of taps 379 leading to suitable contact-terminals 380 with which the controller arms 212 make contact; all the controller arms being preferably on one shaft actuated by the connection 211.

From a crank 381 on the controller shaft there extends a rod 382 which is adapted to operate the trip 383 which actuates the switch 384 (shown as having a blade in each connection) for opening and closing the leads from the stator winding to the busses.

All connections leading to or from the busses are preferably fused as indicated at 385. Automatic circuit-breaking switches, it is understood, may be used instead.

The A-busses are shown diagrammatically as also supplying electric energy to the pair of motor $M_2$ and $M_3$ which are controlled in the same manner as motor $M_1$ by controllers designated 213' and 213'' respectively. The motors $M_2$ and $M_3$ are connected to actuate the fans 87 in the condenser units 11.

As the other auxiliaries are in or near the cab 13, their motors are preferably connected to the B-busses, as indicated. The operative relation of the several motors and their auxiliaries together with the nature of their control is readily ascertained from the following table:

| Motor | Auxiliary | Control |
|---|---|---|
| $M_1$ | Draft fan 152 | Load controlled by cylinder 210. |
| $M_2$ and $M_3$ | Fans 87 in units 11 | Load controlled by cylinder 210. |
| $M_4$ | Draft acc. fan 142 | Load controlled by cylinder 210'. |
| $M_5$ | Stoker feed 185 | Load controlled by cylinder 210'. |
| $M_6$ and $M_7$ | Vac. pumps 84 in units 11 | Load controlled by cylinder 210'. |
| $M_8$ and $M_9$ | Feed pumps 99 in ch. 96 | Float controlled. |
| $M_{10}$ | Boiler feed pump 75 | Load controlled by cylinder 210'. |
| $M_{11}$ | Shunt feed pump 104 | At will. |
| $M_{12}$ | Return pump 106 | At will. |
| $M_{13}$ | Tank feed pump 108 | At will. |
| $M_{14}$ and $M_{15}$ | Air pumps | Pressure controlled. |

The lighting system for the locomotive is also preferably electrical. Accordingly a lighting circuit 390 is shown having lighting units 391 connected thereacross; the circuit 390 being conveniently connected to the B-busses, for example, by means of the transformer connection shown at 392.

The electric generator 70 is shown as provided with an exciter 395 which is preferably embodied mechanically in the generator structure so as to be driven from the same shaft. This exciter is arranged to excite the field 396 of the generator through the connections 397 which are indicated as leading to the cab 13, so that the field excitation may be under the influence of the rheostat 398 which is disposed therein.

*Assembly*

In assembling the various units and organs of this invention, the frame may be regarded as the foundation element of the locomotive structure. The main portion 20 of the frame, when assembled, is adapted to be slipped over the rear members 294 which have been previously fitted over the journaled ends of the axles of the driving-pairs that support the frame.

The frame, when assembled, is also adapted to receive the stoker unit 22, which may be put in place before or after the frame is mounted on the driving wheels. In accordance with unit principle of assembly here preferred, the stoker unit is to be first substantially assembled independently of the frame, so that it may be put in place on the frame as a completed unit. By thus substantially assembling all or at least the major units of the locomotive, independently, the process of final assembly may be greatly facilitated, and the time heretofore required in the assembling process materially lessened; the rails 27 and truss-frame 28 being, of course, part of the main frame, are put in place prior to the mounting of the stoker on the main frame.

When the stoker unit is in place, the furnace and boiler unit 10, preferably in substantially assembled condition, is adapted to be put in place and arranged to fit snugly upon the stoker walls 165. This unit, in addition to the support afforded by the stoker, is adapted to be supported by the front member 25 and the cross members 26.

The condenser units 11 and the structure of the cab 13 may next be put in place, together with the front-top-section 128 of the boiler covering. When the supporting wheels, (including the trailers, if any) are in place, what may be termed the "main stage" of the locomotive construction is substantially completed; the driving gear, and engine units, both main, and auxiliary, are of course still lacking. The pipe connections for the power system and the control system together with the wiring connections for the electrical distributing system may be installed at any convenient stage of the assembly; but are preferably completed upon the completion of the main stage of construction. This involves the installation of the air drums 350, brakes, brake rigging and brake connections.

Sand boxes, for sanding the rails, are also preferably provided as indicated at 400. These sand boxes are disposed between driving wheels and are shown as suspended from a condenser rail 27. Pipe connection 401 leads from these boxes to suitable points adjacent the driving wheels. These sand boxes may be heated if desired in any convenient manner, for example, by electric heaters supplied with electric energy from the electrical distributing system.

The front plate 130 with the auxiliary turbine 68 and electric generator 70 are conveniently next put in place, the same being rigidly supported from the front-top-section 128 and the brackets 132; the generator leads are connected to the A-busses, as indicated in Fig. 52, access being afforded through opening 137.

The removable engine unit is adapted to be put in place at substantially any convenient time, but preferably after the completion of the main stage of construction. This unit, when assembled, has the main turbine 14 and the gear-casing 16 together with the primary exhaust chamber 36, carried by the auxiliary frame 30 which is supported in a mobile manner on the engine truck 37.

This removable engine unit is adapted to be pushed into place, having its bolts 31 arranged to project through the cooperating openings in the front member 25 of the main frame. When thus in place, the bolts are secured by nuts 33. The pipe connections, including those for steam, air, condensate and the like, must of course be completed after the unit is in place. The exhaust connections 15 are also secured in place at this time.

The driving units of the driving gear are preferably finally put into place. A cover member 293 with its removable parts, adapted to fit on the rear members of the forward journal-housing, is preferably the first of these units to be put in place on a side; the remaining units for each side being preferably successively put in place. In this assembly the annular wall members 340 are retained in collapsed condition until the units are placed, when the key grooves 344 in adjacent members 281 are made to register and key members 345 slipped thereinto. The wall members are then extended and secured in place, thus providing rugged but articulated driving connections to the respective driving wheels.

The springs and equalizing connections are with advantage put in place when the supporting wheels are slipped into the frame 20.

When assembling, the cab is of course equipped with such instruments as are deemed desirable or necessary for the proper control and operation of the locomotive. Such instruments are preferably disposed on panels 374 at the two sides of the boiler and may be for example, ammeters to indicate the functioning of the motors and gauges to show the various pressures and the vacuums.

A lubricating system is also provided which is adapted to supply lubricant to the various working parts of the locomotive. Any suitable system known to the art may of course be employed, but as the same is no part of the present invention, the showing of any particular lubricating system has been omitted in the interests of clearness.

Operation

To prepare the locomotive for operation, the power system, particularly the condenser and boiler units, is properly filled with the heat medium which, in the system illustrated, is water. This may be accomplished in any convenient manner, for example by means of the pumps 104 and 108, provided there is a suitable external source of electric power which may be connected to actuate the motors $M_{11}$ and $M_{13}$, which drive these pumps. (Such source of electric power would be preferably provided in engine houses and other places where it is desired to start or initially get under steam a locomotive of this invention).

The boiler having been filled with water, the fire may be started. This is accomplished by introducing fuel to the combustion chamber in any convenient manner, for example, by operating motor $M_5$ to actuate plungers 182 and feed coal onto the grate bars from the fuel hopper 186. Suitable burning fagots or torches are also introduced to start actual combustion. This introduction is preferably accomplished by way of a manhole door 121, which of course is closed again tightly in order that the combustion chamber may properly function. The proper state of combustion on the grates, however, is preferably produced by means of an induced draft, which may be produced initially, i. e. before any steam pressure is up, by introducing fluid under pressure, for example, steam or compressed air, from a suitable external source, through nozzles inserted into the hand holes at 175.

As soon as the steam pressure is up, the auxiliary turbine is started so that there may be a source of electric energy on the locomotive to operate the auxiliaries. The motors $M_{14}$ and $M_{15}$, which actuate the air pumps, will now start automatically to fill the air drums 350 with compressed air so that this secondary source of auxiliary power also will be available shortly after the turbine 68 is started.

With the auxiliary sources of power available, the motors $M_6$ and $M_7$ and the admission valves 94 will function to produce the proper vacuum and pressure in the various condenser chambers thereby enabling the condenser units properly to function when receiving the exhaust from the main turbine.

The locomotive thus in steaming condition, and with its auxiliary sources of power fully available is ready to be run under its own steam. To start the locomotive in a forward direction the reversing lever 359 is first thrown to forward position, i. e. the position in which power cylinder 243 moves frame 242 so as to cause spur-gear 237 to engage with gears 230; the brakes are also released. The throttle is then opened by moving air valve 355 so as to actuate power cylinders 210, 210' and 150, which operate to admit steam to the main turbine by way of the valve chest 65, to admit condensate to primary exhaust chamber 36 by way of valve 102, and to move controllers 213, 213' etc. so as to actuate respectively the motors $M_1$ to $M_7$ and $M_{10}$ and cause their respective auxiliaries to operate in response to the load on the main turbine, the power cylinder 150 operating at the same time to open the superheater dampers 147 so as to open the lower combustion passage through the furnace proportionately to the load.

To reverse the locomotive, it is brought to a stand still, by proper brake applications, and the reversing lever then moved through neutral to its rear position, whereby air is admitted to power cylinder 243 so as to move frame 242 into the position where spur gear 237' engages with gears 230. When again started the locomotive will run backwardly.

In the neutral position of the reversing lever the air valve 358 is as a rule merely closed to the admission or exhaust of further fluid under pressure to the power cylinder 243. The air valve 358, however, may be manipulated so as to move frame 242 to an intermediate position when neither of the spur gears 237 or 237' engage with gears 230. To hold the frame in this position the air valve is then moved to its neutral position. This condition may be referred to as the "neutral gear position", as in this position the main turbine may operate without transmitting any motion to the driving gear.

In the condenser units, the exhaust steam first enters chamber 80$^a$ and passes vertically through a group of tubes 82 into chamber 81$^a$ where it impacts with depending surface-devices 90 which operate to remove globules of condensate from the passing exhaust. The condensate removed gravitates to a sink 91 and thence to auxiliary condensate collecting chamber 96. When sufficient condensate has collected in this chamber, the float 99' is raised and actuates a controller to operate the motor $M_8$ (or motor $M_9$, as the case may be) and drive the pump 99 to discharge the collected condensate into final chamber 83.

The exhaust in passing through the tubes 82 is segmentized by fins 89 dividing it as it were into cells from which the heat is quickly extracted. The air, or other cooling medium, in its conjugate passage over the tubes 82, quickly takes up the heat so extracted through fins 88.

The exhaust in chamber 81$^a$, before it can further advance must change its direction of flow. This change is accelerated by the partial vacuum which is maintained by the pump 84 driven by motor $M_6$ (or motor $M_7$ as the case may be). The exhaust thus zig-zags its way through the sinuous condenser passage decreasing continuously in amount and in temperature until a final remnant is sucked into final chamber 83 where it is cooled and condensed. From chamber 83 condensate is returned to the boiler by way of pipe connections 73 and 74; there being in the instance illustrated a surface exposure of the condensate in primary exhaust chamber 36 in order to reduce initially the volume of the exhaust. In order to maintain the balance of the system, the amount of condensate admitted to the primary exhaust chamber is preferably only that which is condensed in the condenser units. Valve 102 is accordingly designed to graduate the amount thus admitted for the various loads on the main turbine.

The use of relatively high velocities in circulating the cooling air over tubes 82 serves not only to decrease the time required to produce the cooling effect desired but also serves to increase to some extent the coefficient of thermal absorption of the medium thus circulated.

The gearing of the worm to the worm-wheel in journal-housings 283 effects a third gear reduction. This third reduction, however, is in a measure offset by the diameter of the driving wheels 19. The pitch of the worm-gearing and the diameter of the drivers are design factors which may be so chosen that substantially any desired tractive effect may be obtained from the driving gear in locomotives of this invention.

By this invention it will be seen that the modern efficiency methods, at present applied in stationary power plant practice, become at once available for application to locomotives and their type of power plants.

It will also be seen that the working cycle, followed in consequence of the introduction of the improved cooling organs taught by this invention, results in a material increase in the area of temperature-entropy or other diagrams which may be drawn for a given temperature of intake to represent the performance of engines on locomotives, as here employed. The application of such a cycle, however, is not limited to locomotives but may be applied to power systems generally.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In a locomotive machine, the combination with a rigid frame having rail-adapted supporting wheels and provided with a stoker unit, of a boiler unit having a furnace adapted to be disposed over said stoker unit, a separable engine unit rigidly secured forwardly to said frame, driving connections formed as units operatively assembled and disposed between said engine unit and predetermined ones of said supporting wheels, and a condenser unit disposed adjacent said boiler unit on said frame and connected to said engine units; said units being arranged for assembly and disassembly in integral unit relation.

2. In a locomotive machine, the combination with a frame having rail-adapted supporting wheels, of driving means for transmitting propelling force to predetermined ones of said wheels, and a power system carried by said frame; said system comprising an elastic fluid generator, an engine disposed forwardly on said frame and arranged to actuate said driving means, a condenser disposed at a side of said frame and arranged to receive the exhaust from said engine, said condenser having an evacuated cooling chamber and a final compression chamber arranged to collect condensate, means adapted to return condensate to said generator, and means for proportioning respectively the volume of elastic fluid generated and the amount of condensate returned to the tractive effort developed by said engine.

3. In a locomotive machine, the combination with a frame having rail-adapted supporting wheels, of driving means for transmitting propelling force to predetermined ones of said wheels, and a power system carried by said frame; said system comprising an elastic fluid generator, an engine disposed forwardly on said frame and arranged to actuate said driving means, a condenser disposed at a side of said frame and arranged to receive the exhaust from said engine said condenser having an evacuated cooling chamber and a final compression chamber arranged to collect condensate, means adapted to return condensate to said generator, throttling means adapted to control at will the supply of elastic fluid to said engine, and means operatively related to said throttling means for proportioning respectively the rate of generating elastic fluid and the flow of returning condensate to the volume of elastic fluid being supplied.

4. In a self-propelled vehicle, the combination with a frame having propelling means therefor, of a power system operatively coupled to actuate said propelling means; said system comprising an elastic fluid generator, an engine disposed forwardly on said frame and arranged to receive elastic fluid from said generator and to produce driving force, a condenser disposed at a side of said frame and arranged to receive the exhaust from said engine provided with final compression chamber arranged to collect condensate, and means for returning the condensate from said final chamber to said generator at a rate substantially proportional to the driving effort developed.

5. In a self-propelled vehicle, the combination with a frame having supporting wheels therefor, of driving means for propelling predetermined ones of said wheels, and a power system mounted upon said wheels and operatively coupled to actuate said driving means; said power system comprising an elastic fluid generator, an engine disposed forwardly on said frame and arranged to receive elastic fluid from said generator and to transmit driving force to said driving means, a condenser disposed at a side of said frame, said condenser having an evacuated chamber and a final compression chamber arranged to receive successively the exhaust from said engine and to collect condensate, means for returning condensate to said generator, and means for automatically correlating the rate of said return to the volume of elastic fluid received from said generator.

6. In a locomotive machine, the combination with a frame having rail-adapted supporting wheels, of driving means for transmitting propelling force to predetermined ones of said wheels and a power system carried by said frame; said system comprising an elastic fluid generator, an engine disposed forwardly on said frame and adapted to actuate said driving means, and an air-cooled condenser disposed at a side of said frame and arranged to receive the exhaust from said engine said condenser having an evacuated cooling chamber and a final compression chamber arranged to collect condensate, means for conserving the heat of said cooling air and supplying the same to said generator, means for returning condensate to said generator, and means for proportioning respectively the volume of the elastic fluid generated and the amount of condensate returned, to the tractive effort developed by said engine.

7. In a locomotive machine, the combination with a frame having rail-adapted supporting wheels, of driving means for transmitting propelling force to predetermined ones of said wheels, and a power system carried by said frame; said system comprising a furnace-fired elastic fluid generator, an engine disposed forwardly on said frame and arranged to actuate said driving means, an air-cooled condenser disposed at a side of said frame and arranged to receive the exhaust from said engine said condenser having an evacuated cooling chamber, a final compression chamber arranged to collect condensate and a conduit arranged to convey said cooling air from said condenser to the furnace of said generator, power driven means for returning condensate to said generator, and means for proportioning respectively the volume of elastic fluid generated and the amount of condensate returned, to the tractive effort developed by said engine.

8. In a locomotive machine, the combination with a frame having rail-adapted supporting wheels, of driving means for transmitting propelling force to predetermined ones of said wheels, and a power system carried by said frame; said system comprising a furnace-fired elastic fluid generator, a turbine engine arranged to actuate said driving means, a jet condenser arranged to receive the primary exhaust from said engine, an air-cooled condenser arranged to receive exhaust from said jet condenser, said air-cooled condenser having an evacuated cooling chamber and a final compression chamber arranged to collect condensate, means for drawing air through said condenser at a relatively high velocity and conveying the same to the furnace of said generator, power-actuated means adapted for returning condensate to said generator, and means for proportioning respectively the volume of elastic fluid generated and the amount of condensate returned, to the tractive effort developed by said turbine.

9. In a locomotive machine, the combination with a frame having rail-adapted supporting wheels, of means for mechanically driving predetermined ones thereof, a power system including a main engine disposed forwardly on said frame and operatively coupled to actuate said driving means and a condenser, a plurality of power operated auxiliaries, an electric generator disposed forwardly on said frame above said main engine arranged to supply the power for operating said auxiliaries, and an auxiliary engine arranged adjacent to said generator and exhausting into said condenser and to drive said electric generator.

10. In a locomotive machine, the combination with a frame having rail-adapted supporting wheels, of means for mechanically driving predetermined ones thereof, a power system including an elastic fluid generator, a main engine disposed forwardly on said frame and operatively coupled to actuate said driving means, and an air-cooled condenser, means for conveying the cooling air to said elastic fluid generator for combustion purposes, a plurality of power operated auxiliaries, an electric generator disposed forwardly on said frame above said main engine and arranged to supply the power for operating said auxiliaries, and an auxiliary engine arranged adjacent to said generator and exhausting into said condenser and to drive said electric generator.

11. In a locomotive machine, the combination with a frame having rail-adapted supporting wheels, of means for mechanically driving predetermined ones thereof, a power system including an elastic fluid generator, a main engine disposed forwardly on said frame and operatively coupled to actuate said driving means, an air-cooled condenser, means for conveying the cooling air to said generator disposed forwardly on said main frame above said main engine and for combustion purposes, a plurality of power operated auxiliaries, an electric generator arranged to supply the power for operating said auxiliaries, and an auxiliary engine arranged adjacent to said generator and exhausting into said condenser and to drive said electric generator; said electric generator and auxiliary engine being associated as an organic group adapted to be installed and removed as a unit.

12. In a locomotive machine, the combination with rail-adapted supporting wheels, of driving means mechanically coupled to predetermined ones of said wheels for propelling the same, a cab disposed adjacent the rear portion of said machine, a power system including an elastic fluid generator, a turbine engine disposed adjacent the fore-portion of said machine arranged to actuate said driving means, a jet condenser adapted to receive the exhaust from said turbine engine, a throttle valve exterior to said generator arranged to control the supply of elastic fluid to said engine, a jet-controlling valve mechanically connected to said throttle valve; and power means operable from said cab for moving said valves.

13. In a locomotive machine, the combination with rail-adapted supporting wheels, of driving means mechanically coupled to predetermined ones of said wheels for propelling the same, a cab disposed adjacent the rear portion of said machine, a power system including an elastic fluid generator, a turbine engine disposed adjacent the fore-portion of said machine and arranged to actuate said driving means, a jet condenser adapted to receive the exhaust from said turbine engine, a throttle valve exterior to said generator arranged to control the supply of elastic fluid to said engine disposed forwardly on said frame, a source of compressed air, a power cylinder having a piston movable by compressed air arranged to move said valves, and means in said cab for controlling at will the supply of compressed air to said power cylinder.

14. In a locomotive machine, the combination with a frame having rail-adapted supporting wheels, of an elastic fluid generator supported on said frame, an engine mechanically connected to drive certain of said wheels, condensing means including a series of chambers arranged serially at a side of said generator and adapted to receive the exhaust from said engine, said chambers having a final compression chamber provided with power actuated suction means arranged to draw the exhaust from a preceding chamber thereinto under pressure, and means for returning condensate from said final chamber to said generator.

15. In a locomotive machine, the combination with a frame having rail-adapted supporting wheels, of an elastic fluid generator supported on said frame, an engine mechanically connected to drive certain of said wheels, condensing means including a series of chambers arranged serially at a side of said generator and adapted to receive the exhaust from said engine, said chambers having a final compression chamber provided with power-actuated suction means arranged to draw the exhaust from a preceding chamber thereinto under pressure, and means for returning condensate from said final chamber to said generator by way of an intermediate chamber provided with conduits for surface exposure therein of the condensate.

16. In a locomotive machine, the combination with a frame having rail-adapted supporting wheels, of an elastic fluid generator supported on said frame, a turbine engine arranged to be supplied with elastic fluid from said generator and connected mechanically to drive certain of said wheels, an exhaust chamber connected to said turbine engine to receive the direct discharge of the exhaust thereinto, a jet condensing means in said exhaust chamber, an air-cooled condenser including interconnected chambers arranged to receive the exhaust from said exhaust chamber and having a final compression chamber provided with power-actuated suction-means arranged to draw the exhaust from a preceding chamber thereinto under pressure, and means for returning condensate from said final chamber to said generator by way of said exhaust chamber; said exhaust chamber being conduited to provide for the surface exposure therein of said condensate.

17. In a locomotive machine the combination with a frame having rail-adapted supporting wheels, of an elastic fluid generator supported on said frame, a turbine engine arranged to be supplied with elastic fluid from said generator and connected mechanically to drive certain of said wheels, an exhaust chamber connected to said turbine engine to receive the direct discharge of the exhaust thereinto, a jet condensing means in said exhaust chamber, an air-cooled condenser connected to receive the exhaust from said exhaust chamber, said condenser having conduits arranged for the conjugate passage of the heat exchanging media, said conduits being provided with flow segmentizing means, said condenser having a final compression chamber connected to the exhaust conduit, a power actuated suction-means disposed in said connection and arranged to draw the exhaust from said conduit into said final chamber under pressure, and means for returning condensate from said final chamber to said generator.

18. In an engine structure, in combination, a frame adapted to be coupled as an auxiliary to the main frame of a locomotive and provided with rail-adapted supporting wheels, a base-chamber mounted on said frame of a capacity adapted to effect only partial initial condensation of the exhaust, a turbine engine mounted on said base-chamber and arranged to exhaust thereinto, said engine being adapted to be supplied with heat-medium from a locomotive power system, and a removable reduction gear-casing disposed on said frame and operatively coupled to said turbine engine.

19. In an engine structure, in combination, a frame adapted to be coupled as an auxiliary to the main frame of a locomotive and provided with rail-adapted supporting wheels, a base-chamber mounted on said frame of a capacity adapted to effect only partial initial condensation of the exhaust, a turbine engine mounted on said base-chamber and arranged to exhaust thereinto, said engine being mounted on said base-chamber with its axis disposed parallel to the direction of the rails, and provided with valves and operating means therefor arranged to control the supply of heat-medium thereto, and a removable gear-casing disposed on said frame and provided with reduction gearing adapted to transmit motion of rotation from said engine at reduced speeds to the driving gear of the locomotive.

In testimony whereof I affix my signature.

WILLIAM W. FRASER.

CERTIFICATE OF CORRECTION.

Patent No. 1,757,242.  Granted May 6, 1930, to

WILLIAM W. FRASER.

It is hereby certified that error appears in the printed specification of the above numbered patent requiring correction as follows: Page 18, lines 49, 50 and 51, claim 11, strike out the words "disposed forwardly on said main frame above said main engine and" and insert the same to follow after the word "generator" in line 52, same claim; and that the said Letters Patent should be read with this correction therein that the same may conform to the record of the case in the Patent Office.

Signed and sealed this 22nd day of July, A. D. 1930.

(Seal)

Wm. A. Kinnan,
Acting Commissioner of Patents.